United States Patent
Zhan et al.

(10) Patent No.: US 11,979,218 B1
(45) Date of Patent: *May 7, 2024

(54) RADIO FREQUENCY SIGNAL BOOSTERS SERVING AS OUTDOOR INFRASTRUCTURE IN HIGH FREQUENCY CELLULAR NETWORKS

(71) Applicant: Cellphone-Mate, Inc., Fremont, CA (US)

(72) Inventors: Hongtao Zhan, Fremont, CA (US); Scott Terry, Pleasanton, CA (US)

(73) Assignee: Cellphone-Mate, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/248,490

(22) Filed: Jan. 27, 2021

Related U.S. Application Data

(60) Provisional application No. 62/706,719, filed on Sep. 4, 2020, provisional application No. 62/966,736, filed on Jan. 28, 2020.

(51) Int. Cl.
*H04B 7/155* (2006.01)
*H04W 16/26* (2009.01)

(52) U.S. Cl.
CPC ..... *H04B 7/15535* (2013.01); *H04B 7/15507* (2013.01); *H04W 16/26* (2013.01)

(58) Field of Classification Search
CPC . H04B 7/15; H04B 7/26; H04B 7/155; H04B 7/204; H04B 7/15507;

(Continued)

(56) References Cited

U.S. PATENT DOCUMENTS

| | | |
|---|---|---|
| 4,972,346 A | 11/1990 | Kawano et al. |
| 5,369,782 A | 11/1994 | Kawano et al. |

(Continued)

FOREIGN PATENT DOCUMENTS

| | | | |
|---|---|---|---|
| CA | 3065949 A1 * | 12/2018 | ........... G06F 1/1626 |
| CN | 107852223 A | 3/2018 | |

(Continued)

OTHER PUBLICATIONS

Pivotal Echo 5G 28 GHz Repeater with Holographic Beam Forming Technology Datasheet, dated May 2020 in 8 pages.

(Continued)

*Primary Examiner* — Kevin D Mew
(74) *Attorney, Agent, or Firm* — Knobbe, Martens, Olson & Bear, LLP

(57) ABSTRACT

Radio frequency signal boosters serving as outdoor cellular infrastructure are provided. In certain embodiments, a signal booster system includes a downlink donor antenna configured to receive a downlink signal of a frequency band higher than 20 gigahertz (GHz), an uplink server antenna configured to receive an uplink signal of the frequency band, signal booster circuitry including a downlink amplification circuit configured to amplify the downlink signal to generate an amplified downlink signal and an uplink amplification circuit configured to amplify the uplink signal to generate an amplified uplink signal, a downlink server antenna configured to transmit the amplified downlink signal, and an uplink donor antenna configured to transmit the amplified uplink signal.

20 Claims, 16 Drawing Sheets

(58) Field of Classification Search
CPC ............ H04B 7/15535; H04B 7/15542; H04B 7/2606; H04W 16/26; H04W 84/047; H04W 88/04; H04W 88/085
See application file for complete search history.

(56) References Cited

U.S. PATENT DOCUMENTS

| | | | |
|---|---|---|---|
| 8,867,572 B1 | 10/2014 | Zhan | |
| 9,100,839 B2 | 8/2015 | Zhan | |
| 9,402,190 B2 | 7/2016 | Zhan | |
| 9,432,852 B2 | 8/2016 | Zhan et al. | |
| 9,673,886 B2* | 6/2017 | Zhan | H04B 7/15557 |
| 9,775,051 B2* | 9/2017 | Zhan | H04B 7/15528 |
| 9,936,396 B2 | 4/2018 | Zhan | |
| 10,313,893 B2 | 6/2019 | Zhan | |
| 10,585,460 B2* | 3/2020 | Mouser | H04B 7/15564 |
| 11,265,075 B2* | 3/2022 | Zhan | H04B 7/15542 |
| 11,349,556 B2 | 5/2022 | Zhan et al. | |
| 11,595,110 B1* | 2/2023 | Zhan | H04B 7/15535 |
| 11,637,619 B2 | 4/2023 | Zhan et al. | |
| 2004/0110469 A1 | 6/2004 | Judd et al. | |
| 2004/0166802 A1* | 8/2004 | McKay, Sr. | H04B 7/1555 455/7 |
| 2004/0168802 A1* | 9/2004 | Creel | C09K 8/467 507/214 |
| 2006/0014491 A1* | 1/2006 | Cleveland | H04B 7/15571 455/17 |
| 2006/0148468 A1* | 7/2006 | Mann | H04B 17/318 455/422.1 |
| 2006/0205341 A1* | 9/2006 | Runyon | H04B 7/15542 455/11.1 |
| 2006/0205343 A1* | 9/2006 | Runyon | H04B 7/15542 455/11.1 |
| 2007/0218951 A1 | 9/2007 | Risheq et al. | |
| 2007/0254632 A1* | 11/2007 | Beadle | H04M 1/72463 455/411 |
| 2008/0039012 A1* | 2/2008 | Mckay | H04B 7/1555 455/11.1 |
| 2008/0144543 A1 | 6/2008 | Hunton et al. | |
| 2010/0035542 A1 | 2/2010 | Fujishima et al. | |
| 2011/0006957 A1* | 1/2011 | Scire-Scappuzzo | H01Q 9/16 343/810 |
| 2012/0154239 A1 | 6/2012 | Bar-Sade et al. | |
| 2012/0189078 A1* | 7/2012 | Eom | H01Q 1/246 375/295 |
| 2013/0077502 A1* | 3/2013 | Gainey | H04B 7/15578 370/252 |
| 2013/0089021 A1* | 4/2013 | Gaal | H04B 7/155 370/315 |
| 2013/0142222 A1* | 6/2013 | Wang | H04B 7/15578 375/211 |
| 2013/0183895 A1* | 7/2013 | Gore | H04B 7/15571 455/7 |
| 2014/0139395 A1* | 5/2014 | Solondz | H01Q 1/246 343/872 |
| 2015/0070244 A1* | 3/2015 | McCown | H01Q 19/13 343/909 |
| 2015/0351135 A1* | 12/2015 | Schmidt | H04W 52/38 455/450 |
| 2016/0088494 A1 | 3/2016 | Zhan | |
| 2016/0205633 A1* | 7/2016 | Mizusawa | H04B 7/0456 455/522 |
| 2016/0269132 A1 | 9/2016 | Clark et al. | |
| 2016/0381563 A1* | 12/2016 | Khalek | H04W 16/14 455/454 |
| 2017/0111161 A1 | 4/2017 | Raggio et al. | |
| 2017/0111864 A1* | 4/2017 | Ashworth | H04B 1/0057 |
| 2017/0141837 A1 | 5/2017 | Cook et al. | |
| 2017/0317738 A1 | 11/2017 | Lange | |
| 2017/0331546 A1 | 11/2017 | Zhan et al. | |
| 2018/0070323 A1 | 3/2018 | Zhan | |
| 2018/0077585 A1 | 3/2018 | Zhan | |
| 2018/0102828 A1* | 4/2018 | Ashworth | H04B 7/15507 |
| 2018/0139627 A1* | 5/2018 | Ashworth | H04B 7/15507 |
| 2018/0139708 A1 | 5/2018 | Zhan | |
| 2018/0323860 A1* | 11/2018 | Bohls | H04W 52/52 |
| 2018/0331752 A1 | 11/2018 | Ashworth et al. | |
| 2018/0351633 A1 | 12/2018 | Birkmeir et al. | |
| 2018/0364771 A1 | 12/2018 | Mouser et al. | |
| 2019/0089452 A1 | 3/2019 | Ashworth | |
| 2019/0123774 A1 | 4/2019 | Zhan et al. | |
| 2019/0123805 A1* | 4/2019 | Zhan | H04B 7/15535 |
| 2019/0132024 A1 | 5/2019 | Zhan et al. | |
| 2019/0140733 A1 | 5/2019 | Zhan | |
| 2019/0196555 A1* | 6/2019 | Mouser | H04B 7/15528 |
| 2019/0341995 A1 | 11/2019 | Ashworth et al. | |
| 2019/0394734 A1 | 12/2019 | Zhan | |
| 2020/0028568 A1 | 1/2020 | Zhan et al. | |
| 2020/0029226 A1 | 1/2020 | Zhan | |
| 2020/0076465 A1 | 3/2020 | Guo | |
| 2020/0112381 A1* | 4/2020 | Barnes | H04B 7/15535 |
| 2020/0344739 A1 | 10/2020 | Rofougaran et al. | |
| 2020/0350943 A1 | 11/2020 | Zhan et al. | |
| 2020/0389227 A1 | 12/2020 | Zhan et al. | |
| 2020/0403688 A1 | 12/2020 | Zhan et al. | |
| 2022/0399933 A1 | 12/2022 | Zhan et al. | |
| 2023/0396317 A1 | 12/2023 | Zhan et al. | |

FOREIGN PATENT DOCUMENTS

| | | | | |
|---|---|---|---|---|
| WO | WO-87/07439 A1 * | 12/1987 | ............... | H01Q 5/00 |
| WO | WO-2004079946 A1 * | 9/2004 | ......... | H04B 7/15507 |
| WO | WO-2006059074 A2 * | 6/2006 | ........... | H04B 7/0491 |

OTHER PUBLICATIONS

Pivotal Echo 5G 39 GHz Repeater with Holographic Beam Forming Technology Datasheet, dated May 2020 in 8 pages.
Pivotal Commware, Reducing 5G Deployment Costs using Holographic Beam Forming Repeaters from Pivotal Commware, dated May 2020 in 11 pages.
Pivot 5G 28 GHz Network Repeater with Holographic Beam Forming Technology Datasheet, dated Jun. 2020 in 8 pages.

* cited by examiner

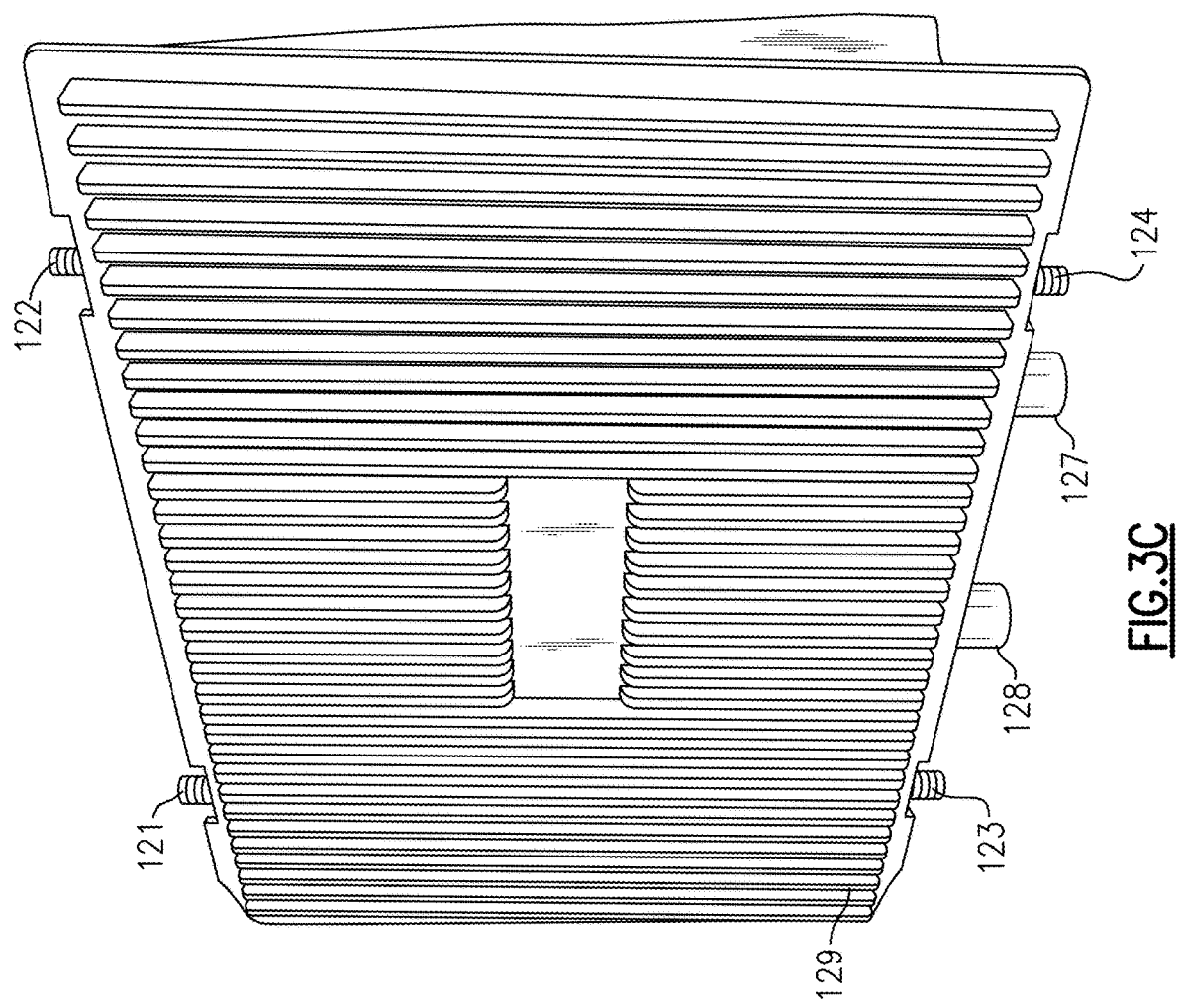

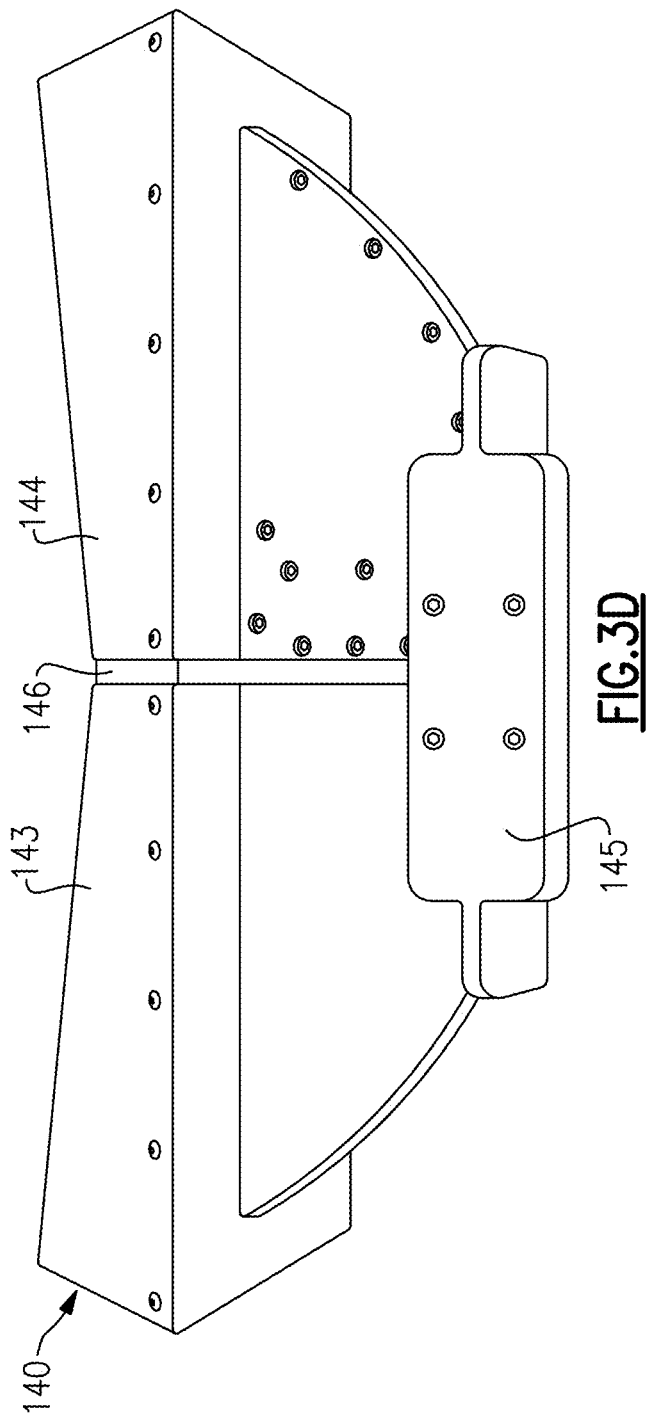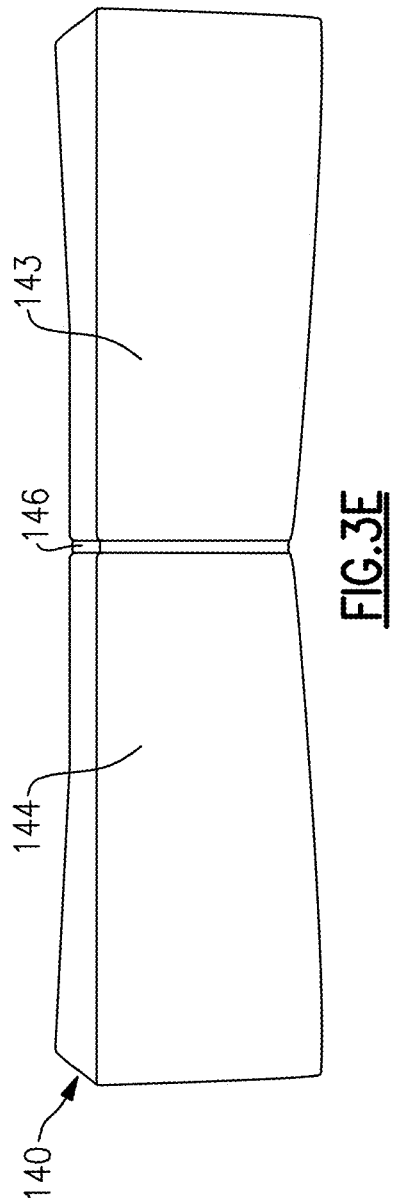

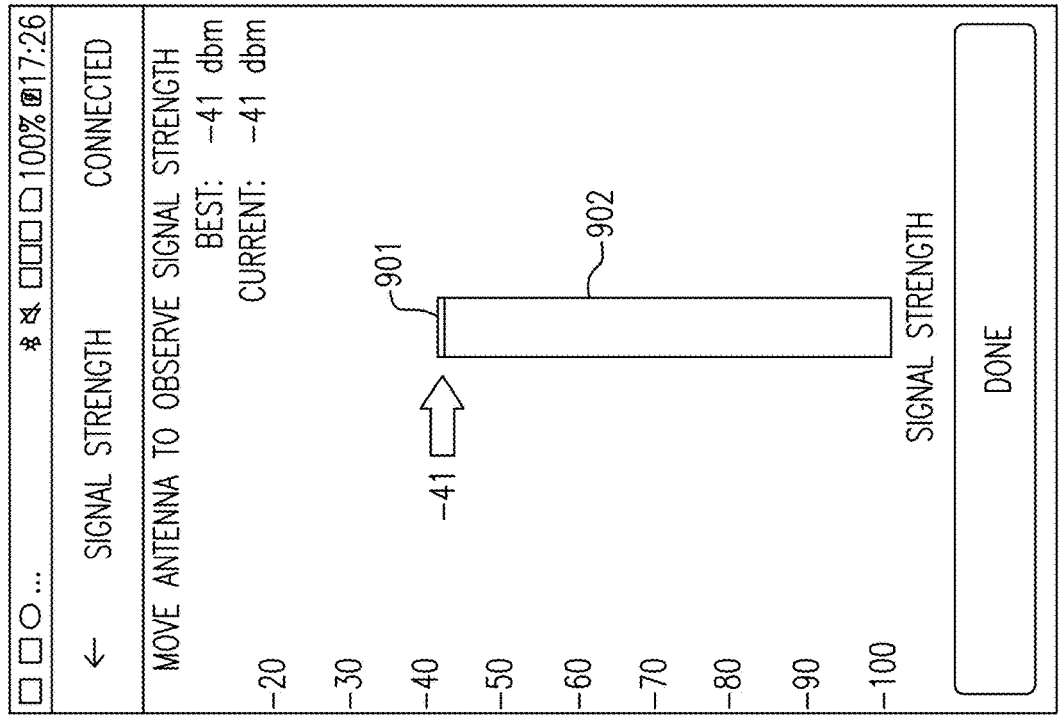

RADIO FREQUENCY SIGNAL BOOSTERS SERVING AS OUTDOOR INFRASTRUCTURE IN HIGH FREQUENCY CELLULAR NETWORKS

REFERENCE TO RELATED CASES

This application claims the benefit of priority under 35 U.S.C. § 119 of U.S. Provisional Patent Application No. 62/706,719, filed Sep. 4, 2020 and titled "RADIO FREQUENCY SIGNAL BOOSTERS SERVING AS OUTDOOR INFRASTRUCTURE IN HIGH FREQUENCY CELLULAR NETWORKS," and of U.S. Provisional Patent Application No. 62/966,736, filed Jan. 28, 2020 and titled "RADIO FREQUENCY SIGNAL BOOSTERS SERVING AS OUTDOOR INFRASTRUCTURE IN HIGH FREQUENCY CELLULAR NETWORKS," each of which is herein incorporated by reference in its entirety.

FIELD

Embodiments of the invention relate to electronic systems and, in particular, to radio frequency (RF) signal boosters.

BACKGROUND

A cellular or mobile network can include base stations for communicating with wireless devices located within the network's cells. For example, base stations can transmit signals to wireless devices via a downlink (DL) channel and can receive signals from the wireless devices via an uplink (UL) channel. In the case of a network using frequency division duplexing (FDD), the downlink and uplink communications are separated in the frequency domain and operate using a pair of frequency channels. In the case of a network using time division duplexing (TDD), the downlink and uplink communications are on a common frequency channel with uplink and downlink transmissions occurring during different time slots.

A wireless device may be unable to communicate with any base stations when located in a portion of the cellular network having poor or weak signal strength. To improve a network's signal strength and/or coverage, a radio frequency (RF) signal booster can be used to amplify signals in the network. For example, the signal booster can be used to amplify or boost signals having frequencies associated with the frequency ranges of the network's uplink and downlink channels.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description of Embodiments" one will understand how the features of this invention provide advantages that include improved communications between base stations and mobile devices in a wireless network.

In one aspect, a signal booster system includes a downlink donor antenna configured to receive a downlink signal of a frequency band higher than 20 gigahertz (GHz), an uplink server antenna configured to receive an uplink signal of the frequency band, signal booster circuitry including a downlink amplification circuit configured to amplify the downlink signal to generate an amplified downlink signal and an uplink amplification circuit configured to amplify the uplink signal to generate an amplified uplink signal, a downlink server antenna configured to transmit the amplified downlink signal, and an uplink donor antenna configured to transmit the amplified uplink signal.

In another aspect, a signal booster system for a high frequency cellular network includes two or more downlink donor antennas configured to receive a downlink signal of a frequency band higher than 20 gigahertz (GHz), the two or more downlink antennas including a first downlink donor antenna and a second downlink donor antenna. The signal booster system further includes two or more downlink server antennas including a first downlink server antenna and a second downlink server antenna. The signal booster system further includes two or more uplink server antennas configured to receive an uplink signal of the frequency band, the two or more uplink server antennas including a first uplink server antenna and a second uplink server antenna. The signal booster system further includes two or more uplink donor antennas including a first uplink donor antenna and a second uplink donor antenna. The signal booster system further includes signal booster circuitry including a first downlink amplification circuit including an input connected to the first downlink donor antenna and an output connected to the first downlink server antenna, a second downlink amplification circuit including an input connected to the second downlink donor antenna and an output connected to the second downlink server antenna, a first uplink amplification circuit including an input connected to the first uplink server antenna and an output connected to a first uplink donor antenna, and a second uplink amplification circuit including an input connected to the second uplink server antenna and an output connected to a second uplink donor antenna.

In another aspect, a signal booster system for a high frequency cellular network is provided. The signal booster system includes a parabolic donor antenna configured to wirelessly communicate over a frequency band that is higher than 20 gigahertz (GHz), n sector server antenna configured to wirelessly communicate over the frequency band, and signal booster circuitry including a first terminal coupled to the parabolic donor antenna and a second terminal coupled to the sector server antenna.

In another aspect, a method of signal booster installation in a high frequency cellular network is provided. The method includes receiving a downlink signal from a base station using a downlink donor antenna of a signal booster system, determining a signal strength of the downlink signal for two or more orientations of the downlink donor antenna using the signal booster system, and displaying a signal strength indicator for at least one of the two or more orientations on a display.

BRIEF DESCRIPTION OF THE DRAWINGS

FIG. 3C is a back perspective view of the signal boosting unit of FIG. 3A.

FIG. 3D is a rear perspective view of a server antenna unit of a signal booster system.

FIG. 3E is a front perspective view of the server antenna unit of FIG. 3D.

FIG. 9A depicts a first screen shot of a mobile device running a signal strength detection application according to one embodiment.

FIG. 9B depicts a second screen shot of a mobile device running a signal strength detection application according to one embodiment.

DETAILED DESCRIPTION OF EMBODIMENTS

Figure 1:
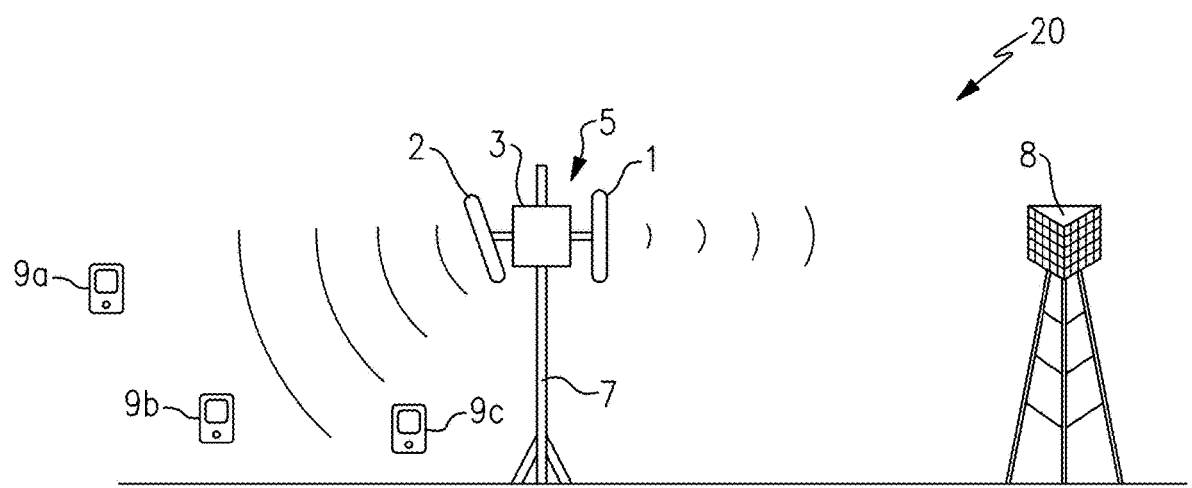
FIG. 1 is a schematic diagram of one embodiment of a signal booster system operating in a cellular network.

Various aspects of the novel systems, apparatus, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatus, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

A number of challenges arise in implementing a high frequency cellular network, such as a fifth generation (5G) network. For example, signal propagation loss increases with frequency. Thus, signals in Frequency Range 2 (FR2) of 5G technologies (24.25 GHz to 52.6 GHz) suffer from very high signal loss. Moreover, a maximum communication range or distance for a given transmit power decreases with signal frequency.

Furthermore, objects in the network have a shielding effect on high frequency signals transmitted and received by mobile devices. Such objects include not only buildings, vehicles, and other such obstructions, but also smaller objects as well. For example, even leaves of a tree can significantly attenuate a high frequency signal.

Such effects cause signal strength to drop. In one example, signal loss reduces signal strength below a threshold for cellular communication, thereby preventing successful voice and/or data communication. In another example, a mobile device operates with higher transmit power to compensate for a loss in signal strength, and thus operates with greater power consumption and reduced battery life. In yet another example, the mobile device operates with lower signal quality, and thus lower data rate and/or lower voice quality.

Moreover, absorption of high frequency signals limits an ability to communicate using multi-path propagation. This in turn increases reliance on line of sight communications and increases a number of cellular access points (for instance, macro cell base stations, small cell base stations, and/or micro cell base stations) needed for providing sufficient network coverage.

There is also a rising demand to communicate with increased data rates to individual users, thereby enabling a range of emerging 5G applications and use cases. However, to accommodate high data rates, an increasingly large number of cellular access points are desired to provide sufficient bandwidth and/or line of sight communications to accommodate nearby users.

Such challenges for high frequency cellular networks lead to a demand for a large number of cellular access points for providing network coverage. For example, in urban areas, cellular access points may be desired on each traffic light and/or lamp post in the city.

Increasing the density of cellular access points gives rise to constraints on infrastructure for backhaul. For example, conventional base stations operate with an optical fiber connection to a core network, further driving up cost of ownership and complexity of the cellular network. Not only in such infrastructure costly, but also decreases speed of deployment. For example, a significant investment of time can be needed to obtain city permits, negotiate easements, dig trenches for fiber or cables, and/or to complete installation.

In accordance with the teachings herein, network coverage is expanded (for instance, to reduce or eliminate coverage gaps in a cell) using signal boosters that boost signals associated with a cellular carrier's network to thereby enhance signal strength.

Rather than providing the full functionality of a base station, the signal boosters can be installed with low cost and complexity. For example, such signal boosters can operate without fiber or cable connections to the back haul. Moreover, the signal boosters include amplification circuitry for RF uplink and RF downlink signals that operates without a need to downconvert the RF signals to baseband. Rather, the signals boosters can provide RF amplification without frequency conversion or digitization, thereby achieving low cost, low component count, and/or low latency. Thus, a need for local oscillators (LOs), mixers, analog-to-digital converters (ADCs), digital-to-analog converters (DACs), and other costly circuitry is eliminated.

Accordingly, signal boosters facilitate the rapid implementation of 5G networks while providing lower cost.

FIG. 1 is a schematic diagram of one embodiment of a signal booster system 5 operating in a cellular network 20. The cellular network 20 represents a portion of a 5G network. The signal booster system 5 can be implemented using any suitable combination of features disclosed herein.

In the illustrated embodiment, the signal booster system 5 includes a directional base station antenna unit 1, a mobile station antenna unit 2, and a signal boosting unit 3 including booster circuitry therein. The signal booster system 5 is installed outdoors, and serves as an outdoor infrastructure booster system.

The signal boosting unit 3 is attached to a pole 7, in this example. The signal boosting unit 3 can be attached to the pole 7 in a wide variety of ways, such as by using a wide variety of mounts, adhesives, and/or fasteners. Although FIG. 1 illustrates an example in which the signal boosting unit 3 is attached to the pole 7, the teachings herein are applicable to other configurations of installation. Examples of such installation configurations include attachment to buildings (for instance, walls or rooftops), bridges, tunnels, traffic lights, telephone poles, towers, and/or other structures.

In the illustrated embodiment, the directional base station antenna unit 1 and the mobile station antenna unit 2 are each connected to the signal boosting unit 3 using a short cable, for instance, a cable of 5 feet or less, or more particularly, 2 feet or less. Such a cable can be, for example, a short millimeter wave coaxial cable. Although an example using cables is depicted, in other implementations, cables are omitted. For example, waveguides can be used additionally or alternatively to cables. In the illustrated embodiment, tubes are used for the cables connecting the directional base station antenna unit 1 and the mobile station antenna unit 2 to the signal boosting unit 3. Using one or more tubes avoids dangling and/or loose cables susceptible to environmental conditions, such as winds.

Although FIG. 1 illustrates an embodiment in which the directional base station antenna unit 1 and the mobile station antenna unit 2 are external to the signal boosting unit 3 and connected by a cable, the teachings herein are also applicable to implementations in which the directional base station antenna unit 1 and/or the mobile station antenna unit 2 are integrated with the signal boosting unit 3. For example, the directional base station antenna unit 1 and/or the mobile station antenna unit 2 can be implemented in and/or to extend from the housing of the signal boosting unit 3. Thus, although depicted as separate from the signal boosting unit 3, the directional base station antenna unit 1 and/or the mobile station antenna unit 2 can be integrated with the signal boosting unit 3 in a common housing.

The signal booster system 5 advantageously operates without a need for a wired or fiber backhaul connection. Accordingly, the signal booster system 5 can have a relatively low installation cost and/or short installation time, thereby increasing speed of deployment in the cellular network 20. Furthermore, multiple instantiations of the signal booster system 5 (for instance, thousands or even millions) can be included in the 5G network, thereby reducing a number of base stations needed in the 5G network and lowering a total cost of infrastructure.

To power the signal booster system 5, a number of configurations are possible, such as receiving power from a wired DC or AC power source (for instance, running a power cable along an outside or an inside of the pole 7) and/or receiving power from a local solar panel. For example, the signal booster system 5 can include a solar power panel for providing power, thereby avoiding a need to run electrical power cables to the signal booster system 5. Since the power consumption of the signal booster system 5 can be relatively low (for instance, about 30 W or less), the solar panel can be of relatively small size for coupling to and/or being integrated with the signal booster system 5. Thus, enhanced flexibility is provided for powering the signal booster system 5 in deployment scenarios in which wired power is difficult and/or costly to provide.

The directional base station antenna unit 1 includes at least one directional transmit antenna and at least one directional receive antenna. For instance, in the illustrated embodiment, the signal booster system 5 is configured to wirelessly communicate with a cellular access point 8, which can be, for example, a base station, a cellular repeater, or another infrastructure signal booster. In one example, the cellular access point 8 corresponds to a base station servicing a neighborhood. In a second example, the cellular access point 8 corresponds to another infrastructure signal booster serving as an intermediary between a base station and the signal booster system 5.

In certain implementations, the receive downlink signal strength at the directional base station antenna unit 1 of the signal booster system 5 is in the range of about −50 dBm to about −70 dBm.

In certain implementations, the directional base station antenna unit 1 has a directionality of at least 28 about dBi. For example, communications of the signal boosting unit 3 can be directional with between about 2 degrees to 3 degrees of beam width. By using the directional base station antenna unit 1, signal energy is focused to aid in overcoming signal path losses while filtering or reducing the signal strength of undesired frequency channels outside the beam width.

The signal booster system 5 includes the mobile station antenna unit 2 for communicating with user equipment (UE) of the cellular network 20, such as mobile devices 9a-9c. In certain implementations, the signal booster system 5 communicates with UE through another infrastructure signal booster serving as an intermediary between the signal booster system 5 and the UE. The mobile station antenna unit 2 includes at least one transmit antenna and at least one receive antenna for transmitting and receiving signals, respectively.

Although the cellular network 20 is illustrated with specific examples of cellular access points and user equipment, the cellular network 20 can implemented with other types equipment. For instance, mobile devices can include mobile phones, tablets, laptops, wearable electronics (for instance, smart watches), and/or other types of UE suitable for use in a wireless communication network. Furthermore, cellular access points can include base stations, signal repeaters, infrastructure boosters, and/or other cellular infrastructure. Moreover any number of such devices and equipment can be present in the network 20.

In certain implementations, the mobile devices 9a-9c can communicate at least in part over multiple frequency bands, including one or more cellular bands associated with 3GPP 5G communications. Such 5G communications can include FR2 communications, such as those of 20 GHz or higher. Signals used in 5G communications are also referred to herein as 5G new radio (5G NR) signals.

In certain implementations, the signal booster system 5 can be configured to boost signals associated with two or more frequency bands so as to improve network reception for each of the mobile devices 9a-9c. Configuring the signal booster system 5 to service multiple frequency bands can improve network signal strength. For example, the signal booster system 5 can improve network signal strength of devices using the same or different frequency bands, the same or different cellular carriers, and/or the same or different wireless technologies. Configuring the signal booster system 5 as a multi-band booster can avoid the cost of separate signal boosters for each specific frequency band and/or cellular carrier.

Figure 2:
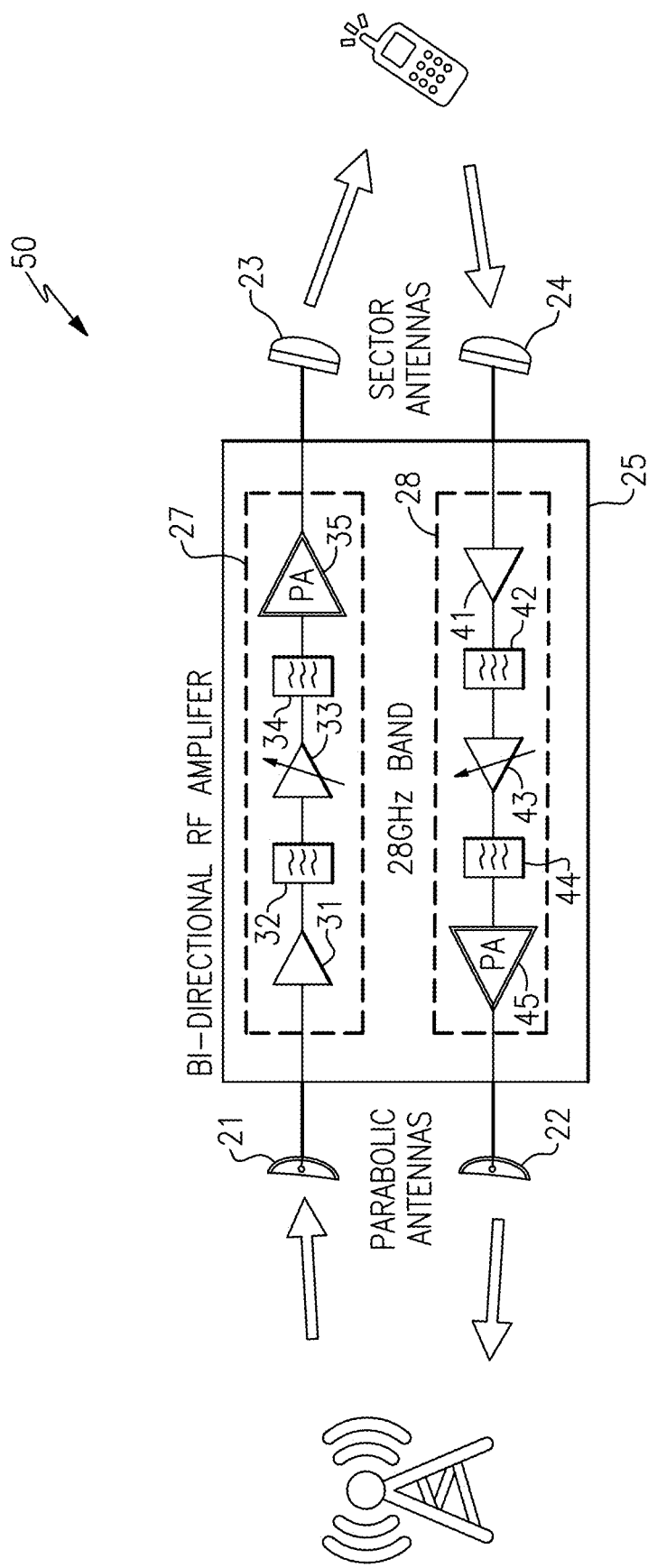
FIG. 2 is a schematic diagram of a signal booster system according to one embodiment.

FIG. 2 is a schematic diagram of a signal booster system 50 according to one embodiment. The signal booster system 50 includes a downlink base station antenna 21 (also referred to herein as a downlink donor antenna), an uplink base station antenna 22 (also referred to herein as an uplink donor antenna), a downlink mobile station antenna 23 (also referred to herein as a downlink server antenna), an uplink mobile station antenna 24 (also referred to herein as an uplink server antenna), and a signal boosting unit 25.

In the illustrated embodiment, the signal boosting unit 25 includes signal boosting circuitry including a downlink amplification circuit 27 and an uplink amplification circuit 28. In this example, the signal boosting unit 25 amplifies 5G frequency band n261, which is a TDD band.

Although depicted in the context of 5G frequency band n261 (27.50 GHz to 28.35 GHz), the teachings herein are applicable to a wide variety of frequency bands, including, but not limited to, 5G frequency band n257 (26.50 GHz to 29.50 GHz), 5G frequency band n258 (24.25 GHz to 27.50 GHz), 5G frequency band n259 (39.50 GHz to 43.50 GHz), 5G frequency band n260 (37.00 GHz to 40.00 GHz), and/or 5G frequency band n261 (17.50 GHz to 28.35 GHz). Moreover, the teachings herein are applicable to other 5G frequency bands in FR2 not yet formalized, including, but not limited to, a contemplated frequency band between 45.4 GHz and 47 GHz, a contemplated frequency band between 47.2 GHz and 48.2 GHz, and/or a contemplated frequency band between 66 GHz and 71 GHz.

As shown in FIG. 2, the downlink donor antenna 21 and the uplink donor antenna 22 are implemented as parabolic antennas, in this embodiment.

Using parabolic antennas as donor antennas provides a number of advantages. For example, parabolic antennas can have excellent performance characteristics for transmitting FR2 5G signals to a base station and for receiving FR2 5G signals from the base station. For example, the directionality of the parabolic antennas serves to filter signal content to only those signals from a specific spatial direction (a particular angular range). Thus, the parabolic antennas can be pointed at a particular base station, while filtering out RF signals arriving from other directions away from the base station.

Furthermore, parabolic antennas provide excellent front and back ratio (isolation). Thus, when implementing the donor antennas as parabolic antennas, sufficient isolation between donor and server antennas is provided to avoid oscillation and/or other undesired antenna-to-antenna feedback or interference. Moreover, in comparison to configurations using active beamforming (and even passive beamforming), using parabolic antennas to communicate with a base station provides lower cost and less complexity.

To provide spatial filtering, it is desirable for a parabolic antenna to have high gain to serve well as a filter. However, at very high gains, size of the parabolic antennas (for instance, antenna radius size) can become an issue, for instance, in applications in which the parabolic antennas are hung from a pole. Moreover, if gain is too high, aiming can become an issue, thereby rendering installation difficult and/or resulting in loss of communication with a base station in windy conditions in which a pole sways. Accordingly, in certain implementations, the gain of the parabolic donor antennas is selected to be between 26 dBi to 30 dBi, or more particularly, 27 dBi and 29 dBi, for instance, about 28 dBi.

With continuing reference to FIG. 2, the downlink server antenna 23 and the uplink server antenna 24 are implemented as sector antennas, in this embodiment. In certain implementations, the sector antennas provide coverage over a horizontal angular width of at least about 60 degrees, or more particularly, at least about 90 degrees. Thus, the downlink sector antennas can provide coverage over slices or wedges of area in a cellular network.

In certain implementations, the donor antennas and server antennas are implemented without any beamforming, for instance, without active beamforming and without passive beamforming. Furthermore, the donor antennas and server antennas can be implemented without a need for antenna arrays, thereby reducing cost and complexity.

In the illustrated embodiment, the downlink circuit 27 includes a low noise amplifier (LNA) 31, a first bandpass filter 32, a variable gain amplifier (VGA) 33, a second bandpass filter 34, and a power amplifier (PA) 35. Additionally, the uplink circuit 28 includes an LNA 41, a second bandpass filter 42, a VGA 43, a second bandpass filter 44, and a PA 45. However, other implementations of downlink and/or uplink circuits are possible.

Examples of circuitry and components of a signal boosting unit include, but are not limited to, amplifiers (for instance, LNAs, PAs, VGAs, programmable gain amplifiers (PGAs), and/or other amplification circuits), filters (for instance, surface acoustic wave (SAW) filters, bulk acoustic wave (BAW) filters, film bulk acoustic resonator (FBAR) filters, active circuit filters, passive circuit filters, and/or other filtering structures), duplexers, circulators, frequency multiplexers (for instance, diplexers, triplexers, or other multiplexing structures), switches, impedance matching circuitry, attenuators (for instance, digital-controlled attenuators such as digital step attenuators (DSAs) and/or analog-controlled attenuators such as voltage variable attenuators (VVAs)), detectors, monitors, couplers, and/or control circuitry.

In certain implementations, the bandpass filters are configurable to provide band selection. For example, the bandpass filters can have controllable bandpass characteristics for selecting different frequency bands, for instance, n257, n258, n259, n260, n261.

The signal booster system 50 operates without a switch for connecting the input of the downlink circuit 27 and the output of the uplink circuit 28 to a common donor antenna, and without a switch for connecting the output of the downlink circuit 27 and the input of the uplink circuit 28 to a common server antenna. Thus, the signal booster system 50 omits TDD switches. Rather, the signal booster system 50 includes the downlink donor antenna 21 and the uplink donor antenna 22 rather that a shared donor antenna used for both transmit and receive. Additionally, the signal booster system 50 includes the downlink server antenna 23 and the uplink server antenna 24 rather that a shared server antenna used for both transmit and receive.

In certain implementations, at least one of the downlink donor antenna 21, the uplink donor antenna 22, the downlink server antenna 23, or the uplink server antenna 24 is connected to signal boosting circuitry of the signal boosting unit 25 by way of a wave guide.

The signal booster system 50 can be implemented with one or more features to enhance robustness to outdoor conditions. For example, in certain implementations, the signal booster system 50 (for example, the signal boosting unit 25, the sector antennas, the donor antennas, and/or any cables) are compliant with IP66 and/or IP67 rating to provide waterproofing as well as other environmental protections.

In certain implementations herein, a signal booster system, such as the signal booster system 50 of FIG. 2, is implemented to provide wideband operation by amplifying multiple channels of (for instance, a full bandwidth of) a 5G NR band. For example, the bandwidth of bandpass filters (for instance, bandpass filters 32, 34, 42, and/or 44) can be implemented to pass the frequency range including the multiple channels while attenuating or blocking other frequencies.

Thus, a need to separate each frequency channel or channelize is avoided. In one example, a signal booster system amplifies at least two channels of a 5G NR band. In a second example, a signal booster system amplifies at least four channels of a 5G NR band. In a third example, a signal booster system amplifies at least eight channels of a 5G NR band. In certain implementations, the channels amplified by the signal booster system are separately licensable to two or more different cellular carriers, such as Verizon, AT&T, T-Mobile, or Sprint.

Figure 3A:
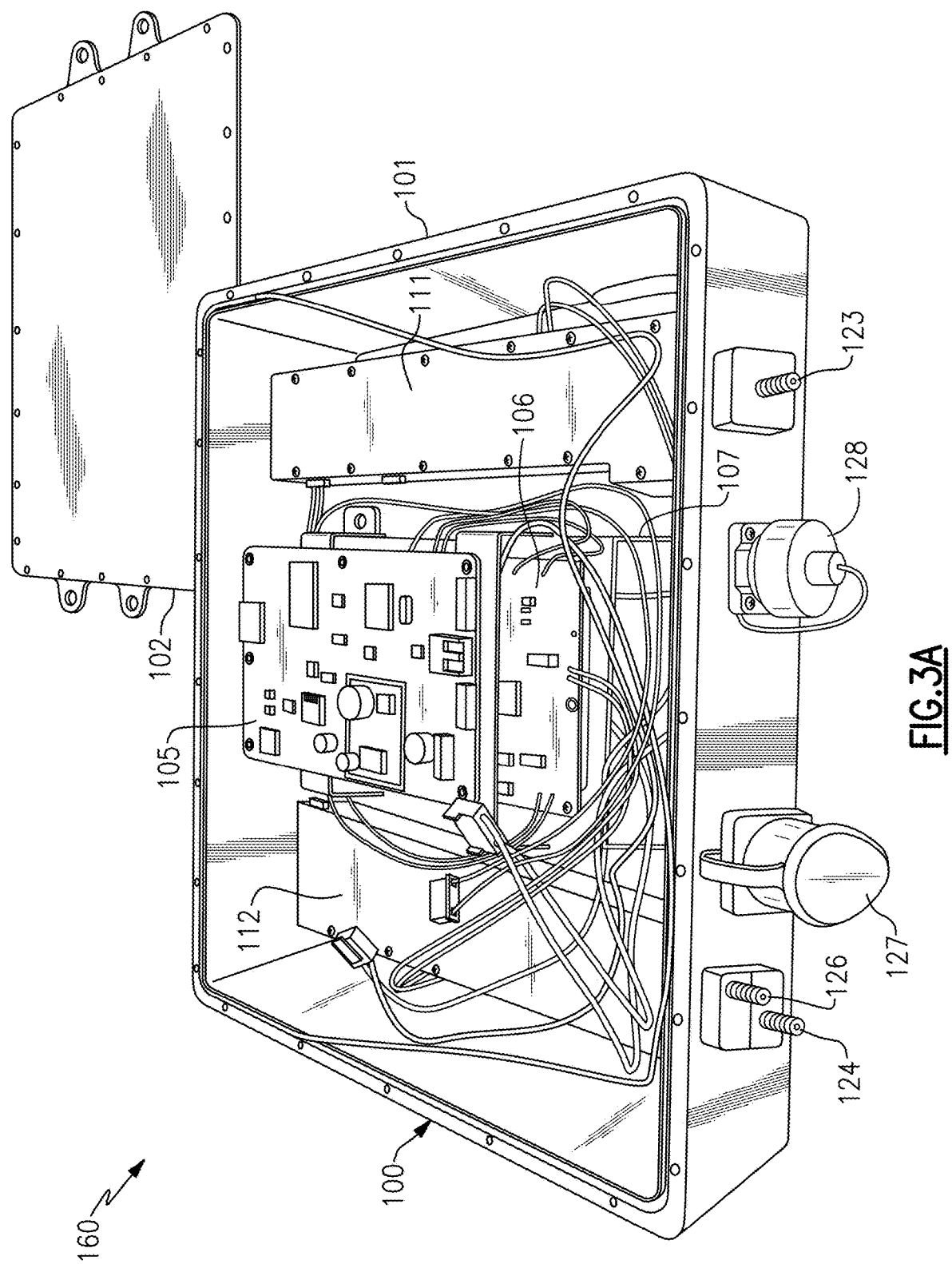
FIG. 3A is a front perspective view of a signal boosting unit of a signal booster system.
Figure 3B:
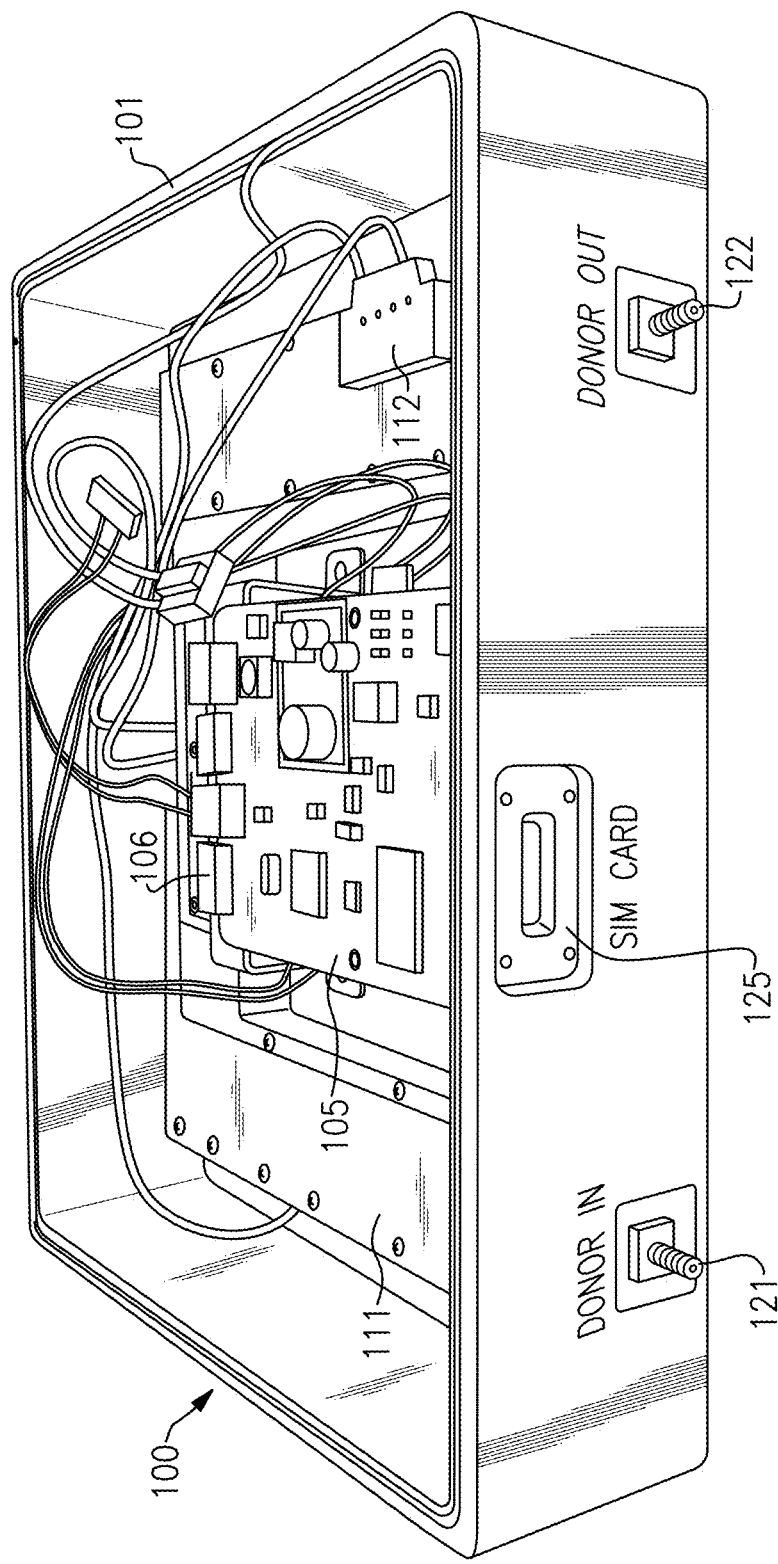
FIG. 3B is a rear perspective view of the signal boosting unit of FIG. 3A.
Figure 3G:
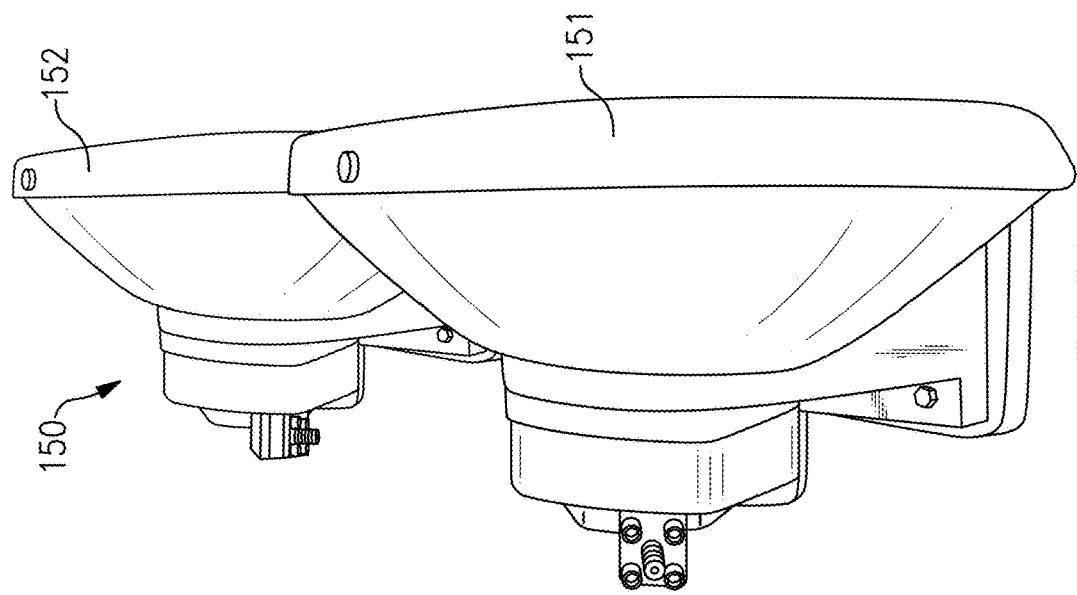
FIG. 3G is a side perspective view of the donor antenna unit of FIG. 3F.
Figure 3F:
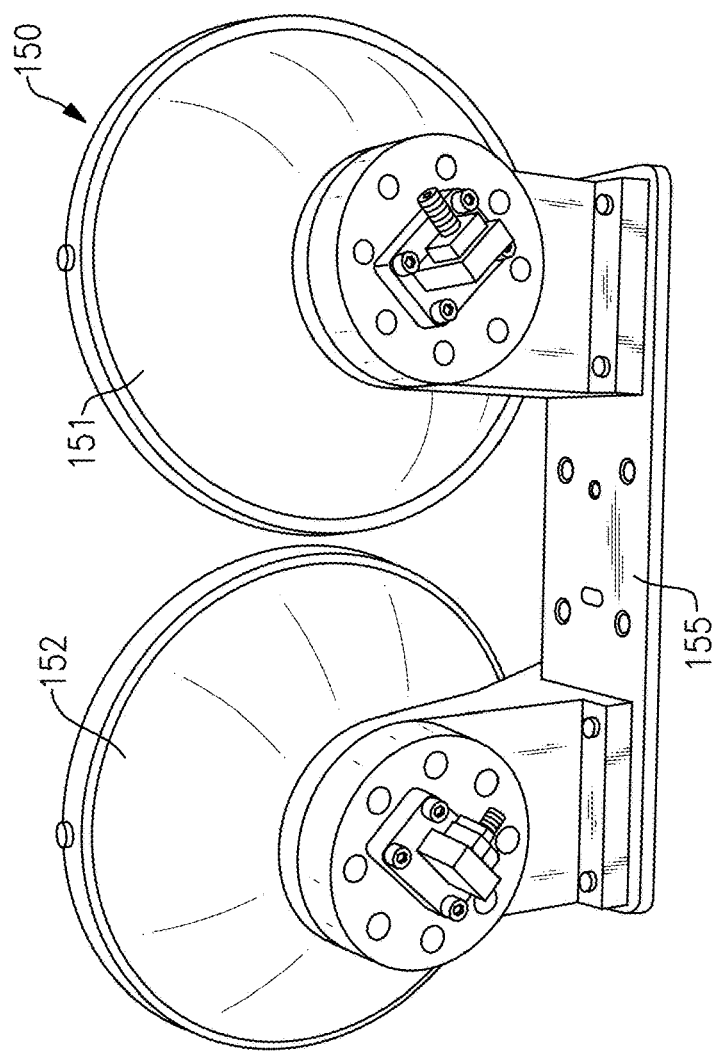
FIG. 3F is a rear perspective view of a donor antenna unit of a signal booster system.

FIG. 3A is a front perspective view of a signal boosting unit 100 of a signal booster system 160. FIG. 3B is a rear perspective view of the signal boosting unit 100 of FIG. 3A. FIG. 3C is a back perspective view of the signal boosting unit 100 of FIG. 3A. FIG. 3D is a rear perspective view of a server antenna unit 140 of the signal booster system 160. FIG. 3E is a front perspective view of the server antenna unit 140 of FIG. 3D. FIG. 3F is a rear perspective view of a donor antenna unit 150 of the signal booster system 160. FIG. 3G is a side perspective view of the donor antenna unit 150 of FIG. 3F.

With reference to FIGS. 3A-3G, the signal booster system 160 illustrates one embodiment of the signal booster system 50 of FIG. 2. Although one embodiment of a signal booster system is depicted, the teachings herein are applicable to signal booster systems implemented in a wide variety of ways.

In the illustrated embodiment, the signal boosting unit 100 includes a housing including a housing body 101 and a cover 102. The signal boosting unit 100 further includes a communications circuit board 105, a control circuit board 106, a switched-mode power supply 107, a shielded downlink amplification circuit 111, a shielded uplink amplification circuit 112, a downlink donor antenna port 121, an uplink donor antenna port 122, a downlink server antenna port 123, an uplink server antenna port 124, a SIM card port 125, an Internet of Things (IoT) port 126, a first power port 127, a second power port 128, and a heat sink 129.

With reference to FIGS. 3D and 3E, the server antenna unit 140 includes a downlink sector antenna 143, an uplink sector antenna 144, a mounting bracket 145, and an isolation layer 146. The downlink sector antenna 143 connects to the downlink server antenna port 123 over a cable (not shown) and serves to transmit an amplified downlink signal to UE. Additionally, the uplink sector antenna 144 connects to the uplink server antenna port 124 over a cable (not shown) and serves to receive an uplink signal from the UE.

In certain implementations, the communications circuit board 105 is operable to communicate control information (for instance, to receive settings for gain control or other functionality or to provide information pertaining to the status of the signal booster system) using wired or wireless communications, for instance, via Bluetooth or by way of the IoT port 126.

As shown in FIGS. 3D and 3E, the downlink sector antenna 143 and the uplink sector antenna 144 are physically joined to one another by the mounting bracket 145, which also serves to attach the server antenna unit 140 to a desired structure (for instance, a pole). In certain implementations, the downlink sector antenna 143 and the uplink sector antenna 144 are each implemented as a horn antenna.

In the illustrated embodiment, the isolation layer 146 is included to enhance RF isolation between the downlink sector antenna 143 and the uplink sector antenna 144. Providing antenna to antenna isolation in this manner aids in inhibiting oscillation, thereby allowing a shielded downlink amplification circuit 111 and/or the shielded uplink amplification circuit 112 to reliably operate with higher levels of gain.

One example of a suitable material for implementing the isolation layer 146 is a lossy foam absorber, for instance, a polyether reticulated foam having a thickness of 5 mm or more.

With reference to FIGS. 3F and 3G, the donor antenna unit 150 includes a downlink parabolic antenna 151, an uplink parabolic antenna 152, and a mounting bracket 155. The downlink parabolic antenna 151 connects to the downlink donor antenna port 121 over a cable (not shown) and serves to receive a downlink signal from a base station. The downlink signal is provided to an input of the shielded downlink amplification circuit 111, which amplifies the downlink signal to provide an amplified downlink signal to the downlink server antenna port 123.

The uplink parabolic antenna 152 connects to the uplink donor antenna port 122 over a cable (not shown) and serves to transmit an amplified uplink signal to a base station. The amplified uplink signal is provided by an output of the shielded uplink amplification circuit 112, which generates the amplified uplink signal based on amplifying an uplink signal received from the uplink server port 124.

As shown in FIGS. 3F and 3G, the downlink parabolic antenna 151 and the uplink parabolic antenna 152 are physically joined to one another by the mounting bracket 155, which also serves to attach the donor antenna unit 150 to a desired structure (for instance, a pole).

With reference to FIGS. 3A to 3G, two cables (for instance, a first pair of millimeter wave coaxial cables) are used for connecting between the signal boosting unit 100 and the server antenna unit 140, and another two cables (for instance, a second pair of millimeter wave coaxial cables) are used for connecting between the signal boosting unit 100 and the donor antenna unit 150. In certain implementations, the four cables are run through a common tube, thereby avoiding dangling and/or loose cables susceptible to environmental conditions, such as winds.

Figure 4A:
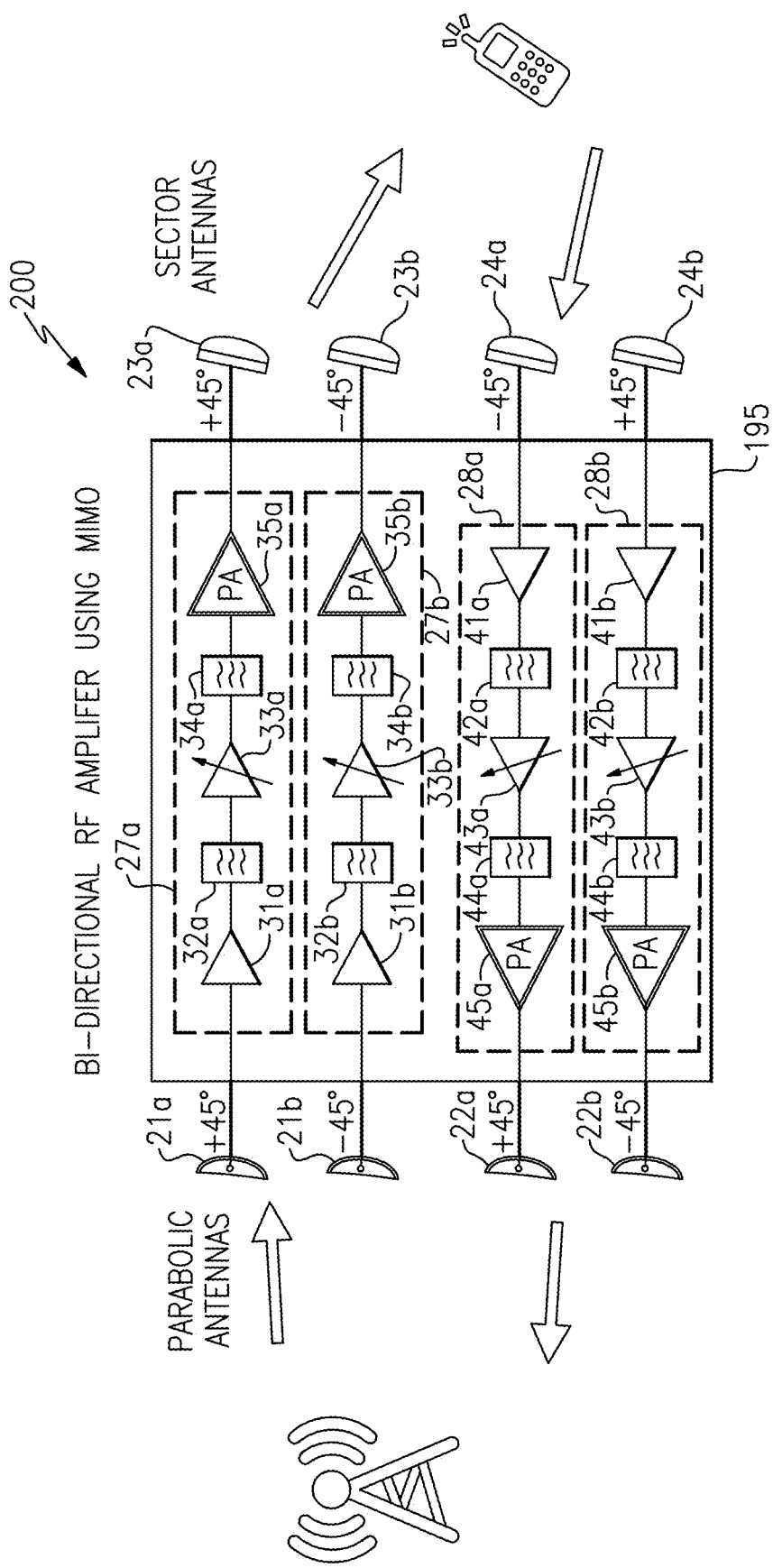
FIG. 4A is a schematic diagram of a signal booster system according to another embodiment.

FIG. 4A is a schematic diagram of a signal booster system 200 according to another embodiment. The signal booster system 200 includes a first downlink donor antenna 21a, a second downlink donor antenna 21b, a first uplink donor antenna 22a, a second uplink donor antenna 22b, a first downlink server antenna 23a, a second downlink server antenna 23b, a first uplink server antenna 24a, a second uplink server antenna 24b, and a signal boosting unit 195.

In the illustrated embodiment, the signal boosting unit 195 includes a first downlink amplification circuit 27a having an input connected to the first downlink donor antenna 21a and an output connected to the first downlink server antenna 23a, a second downlink amplification circuit 27b having an input connected to the second downlink donor antenna 21b and an output connected to the second downlink server antenna 23b, a first uplink amplification circuit 28a having an input connected to the first uplink server antenna 24a and an output connected to the first uplink donor antenna 22a, and a second uplink amplification circuit 28b having an input connected to the second uplink server antenna 24b and an output connected to the second uplink donor antenna 22b.

In comparison to the signal boosting system 50 of FIG. 2, the signal boosting system 200 of FIG. 4A is implemented with an additional set of server antennas, donor antennas, and amplification circuits to achieve multi-input multiple-output (MIMO) communications.

As shown in FIG. 4A, the donor and server antennas are implemented with particular polarizations to enhance antenna-to-antenna isolation and stability of the signal booster system 200. In the illustrated embodiment, the antennas 21a, 22a, 23a, and 24b have a first type of polarization (for instance, +45°) while the antennas 21b, 22b, 23b, and 24a have a second type of polarization (for instance, −45°) that is substantially orthogonal to the first polarization.

Figure 4B:
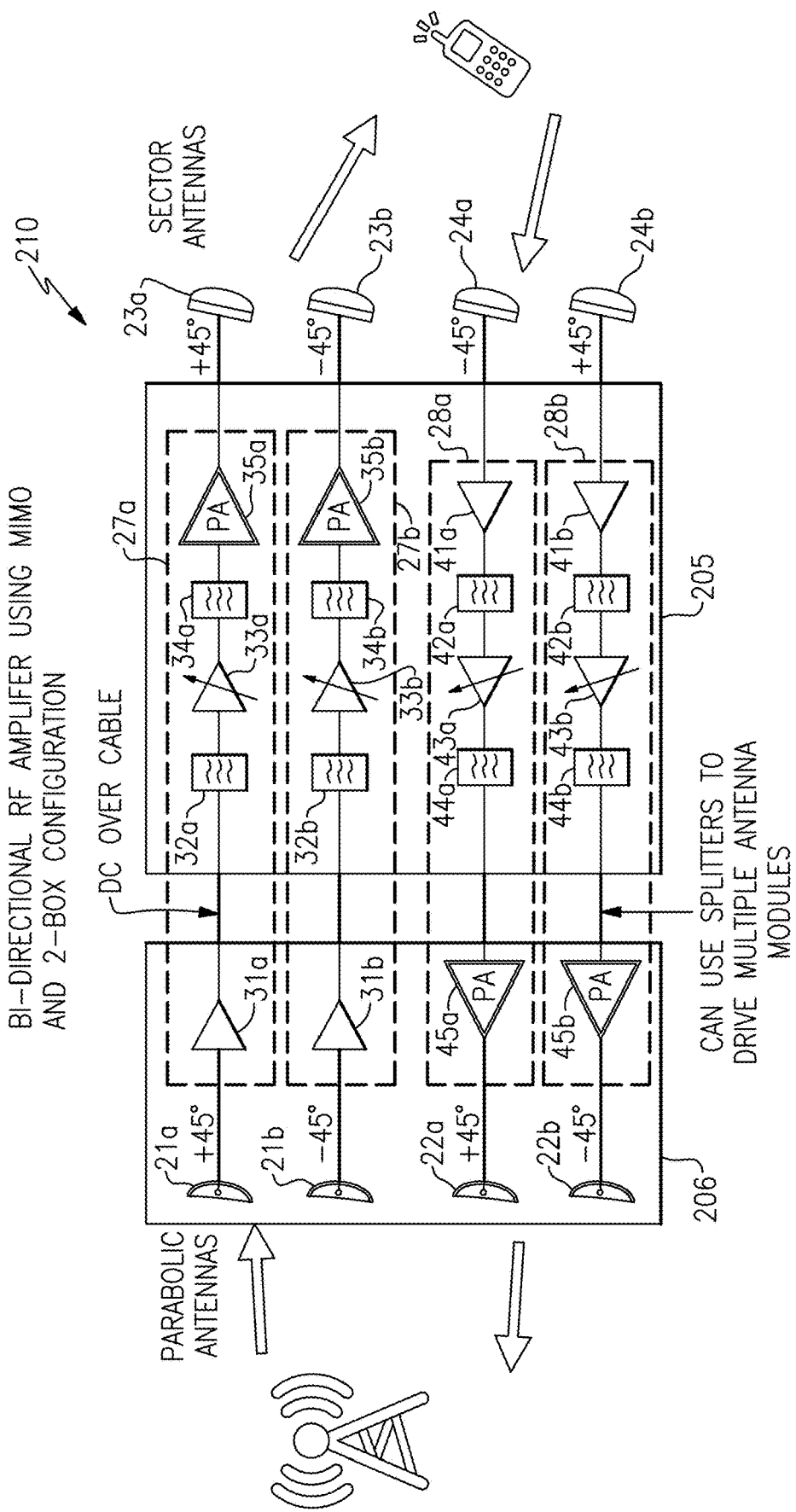
FIG. 4B is a schematic diagram of a signal booster system according to another embodiment.

FIG. 4B is a schematic diagram of a signal booster system 210 according to another embodiment.

The signal booster system 210 of FIG. 4B is similar to the signal booster system 200 of FIG. 4A, except that the signal booster system 210 includes PAs and LAs that are implemented locally to the donor antennas in a donor antenna module 206 that is separated from the signal boosting unit 205 by cables.

By implementing the signal booster system 210 in this manner, higher signal-to-noise ratio (SNR) and/or enhanced flexibility is achieved. In certain implementations, active circuitry of the donor antenna module 206 (for instance, PAs and LNAs) receive DC power over the cables from the signal boosting unit 205. In certain implementations, an RF signal and DC power is sent over a common cable (for instance, with the RF signal superimposed on a DC signal serving as a DC supply voltage for the donor antenna module 206).

As depicted by annotation in FIG. 4B, splitters can be used by the signal boosting unit 205 to driver multiple instantiations of the donor antenna module 206. Implementing the signal boosting system 210 in this manner can aid in providing flexibility in deploying the signal boosting system 210 in a cellular network. Such splitters can be included internal to the signal boosting unit 205 and/or included externally.

Figure 4C:
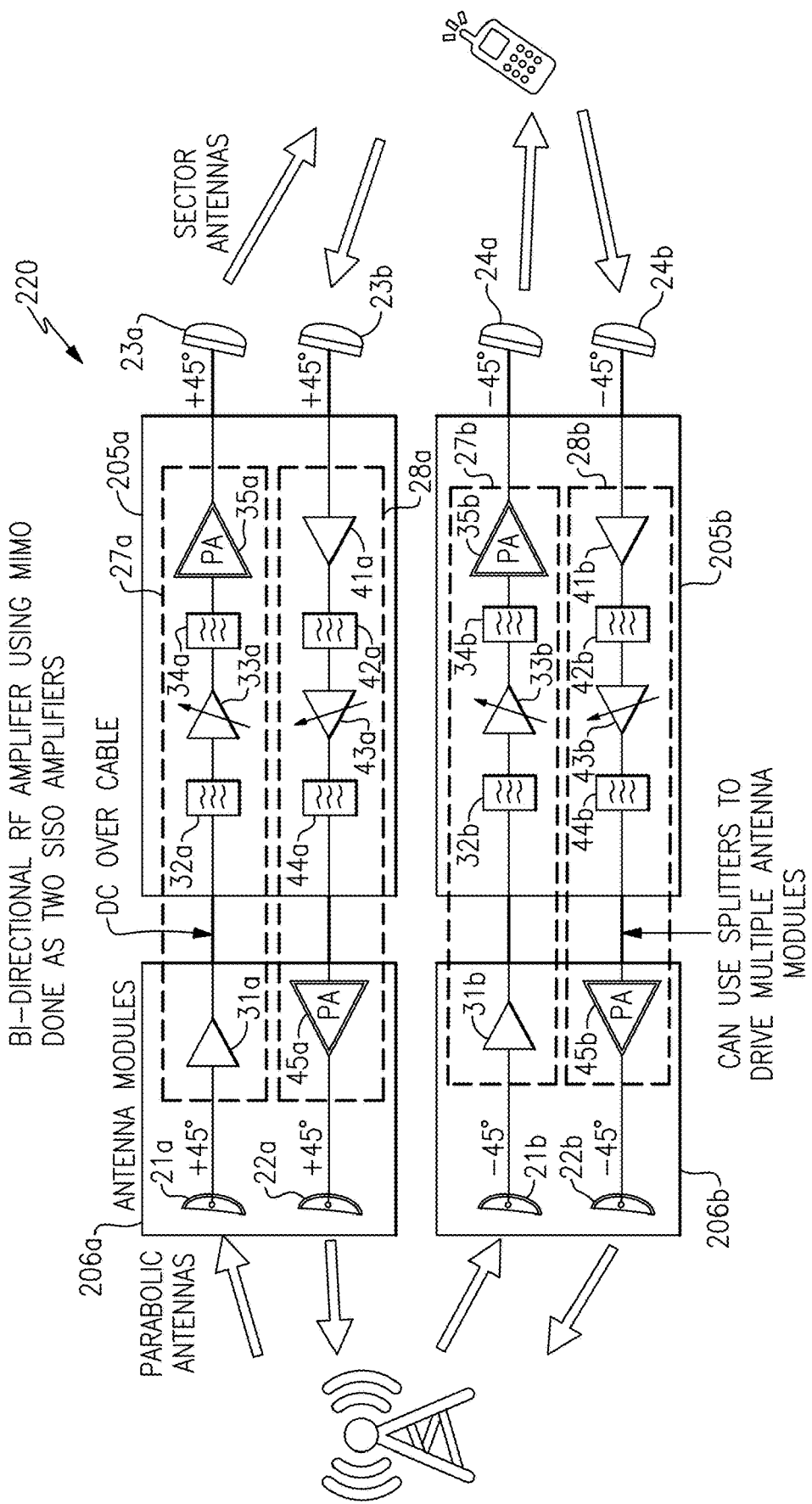
FIG. 4C is a schematic diagram of a signal booster system according to another embodiment.

FIG. 4C is a schematic diagram of a signal booster system 220 according to another embodiment.

The signal booster system 220 of FIG. 4C is similar to the signal booster system 210 of FIG. 4B, except that the signal booster system 220 includes a further partitioning to provide a four module or unit solution.

In particular, the signal booster system 220 is partitioned into a first donor antenna module 206a, a second donor antenna module 206b, a first signal boosting unit 205a, and a second signal boosting unit 205b, each depicted with example circuitry associated with four module partitioning.

Figure 5A:
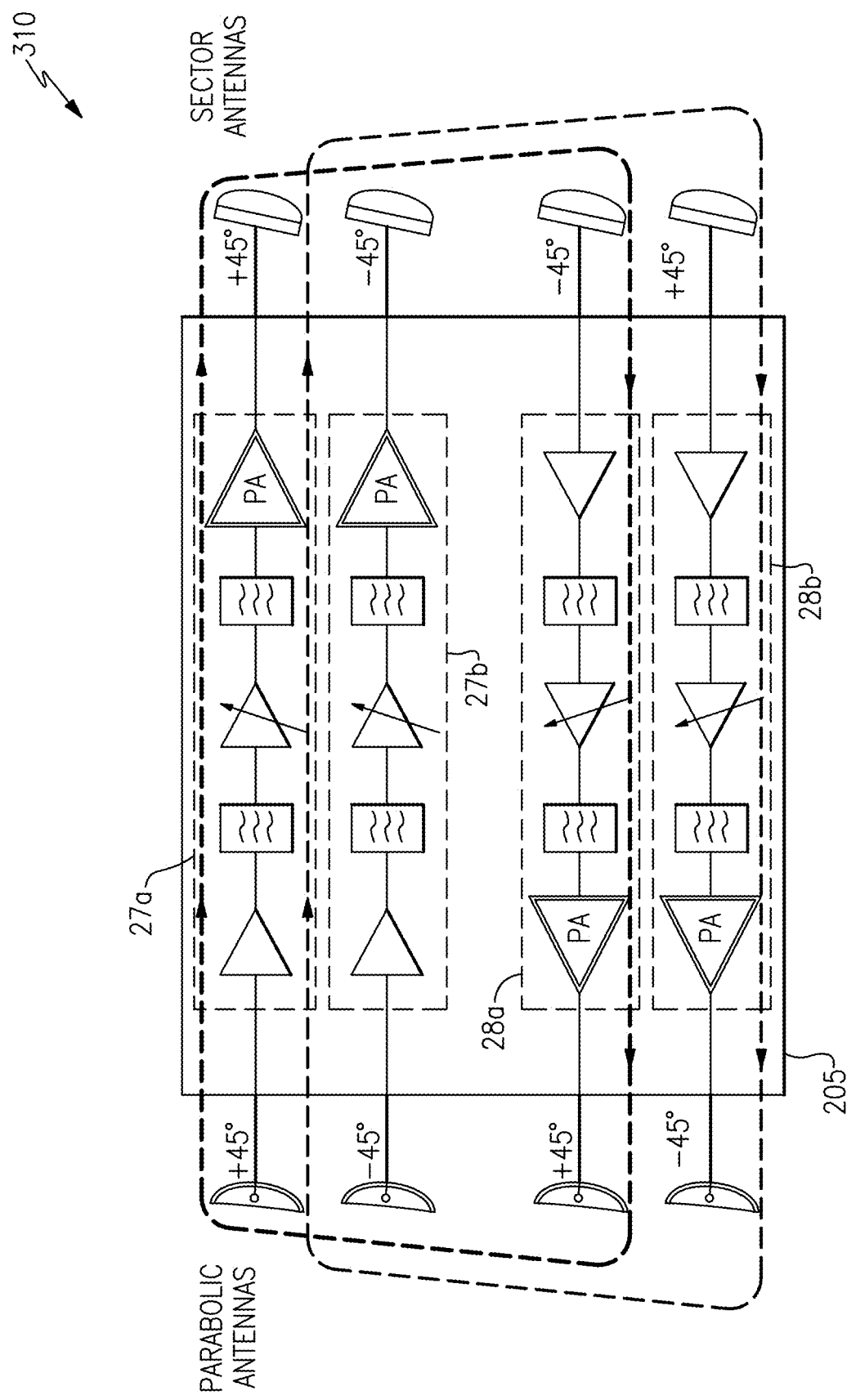
FIG. 5A is a schematic diagram depicting one example of antenna polarization of a signal booster system.
Figure 5B:
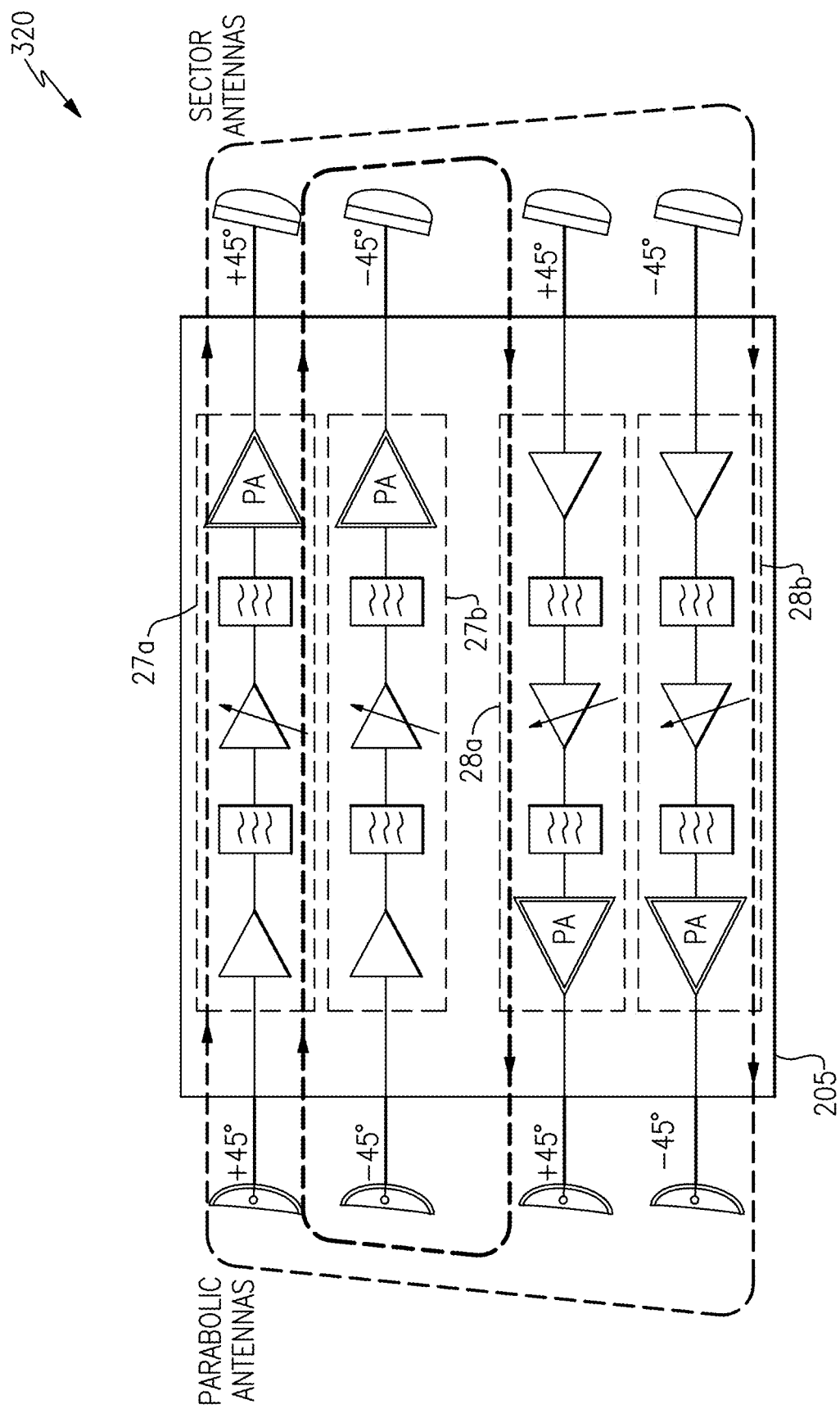
FIG. 5B is a schematic diagram depicting another example of antenna polarization of a signal booster system.

FIG. 5A is a schematic diagram depicting one example of antenna polarization of a signal booster system 310. FIG. 5B is a schematic diagram depicting another example of antenna polarization of a signal booster system 320.

With reference to FIG. 5A and FIG. 5B, both the signal booster system 310 and the signal booster system 320 include the signal boosting unit 205 described above with respect to FIG. 4A. Both the signal booster system 310 and the signal booster system 320 also include a pair of downlink donor antennas, a pair of uplink donor antennas, a pair of downlink server antennas, and a pair of uplink server antennas.

However, different implementations of antenna polarizations are depicted for the signal booster system 310 and the signal booster system 320. FIGS. 5A and 5B have also been annotated to depict example feedback paths that have the potential to induce oscillation or system instability.

As shown by a comparison of FIG. 5A and FIG. 5B, the signal booster system 310 exhibits higher isolation by having at least one orthogonal antenna pair for each feedback path. Thus, the configuration of antenna polarization of the FIG. 5A provides superior isolation.

Figure 6A:
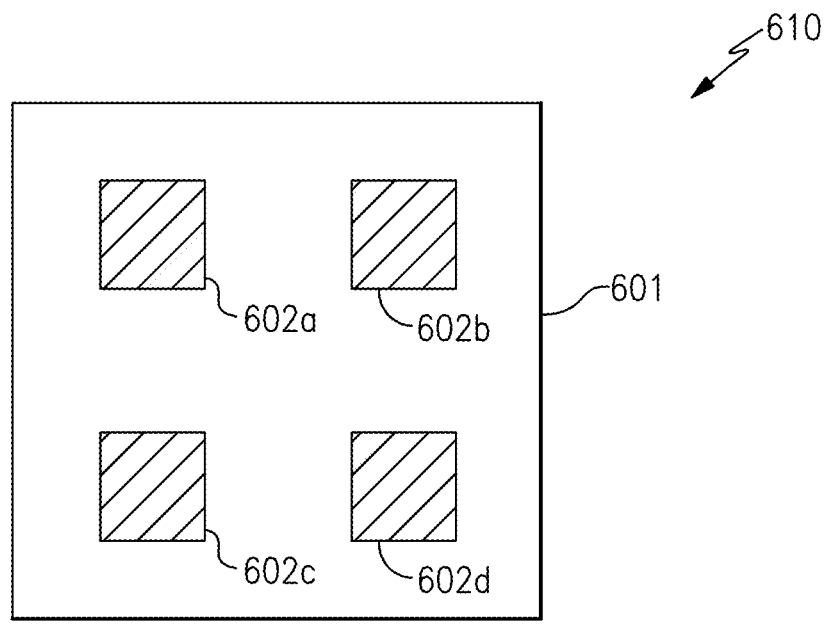
FIG. 6A is a diagram of an overhead or frontal view of one embodiment of a passive antenna array.
Figure 6B:
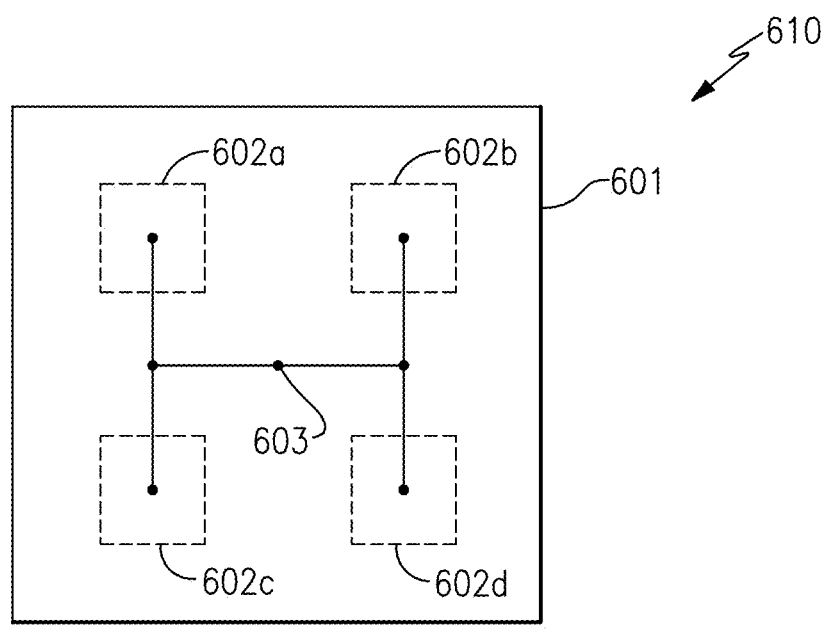
FIG. 6B is a diagram of a backside view of the passive antenna array of FIG. 6A.

FIG. 6A is a diagram of an overhead view of one embodiment of a passive antenna array 610. FIG. 6B is a diagram of a backside view of the passive antenna array 610 of FIG. 6A. The passive antenna array 610 includes a first patch antenna element 602a, a second patch antenna element 602b, a third patch antenna element 603c, and a fourth patch antenna element 602d formed on a first or front surface of an antenna substrate 601, such as a printed circuit board (PCB).

The passive antenna array 610 illustrates one embodiment of a passive antenna array for serving as a server antenna. However, the teachings herein are applicable to server antennas implemented in a wide variety of ways, including, but not limited to, using sector antennas, such as horn antennas.

The antenna elements 602a-602d are positioned in different physical locations to provide spatial diversity. As shown in FIG. 6B, the antenna elements 602a-602d are controlled using a common signal feed 603 to provide passive beamforming. Thus, when the passive antenna array 610 is receiving, the signals are combined to form an aggregate or combined receive signal. Additionally, when the passive antenna array 610 is transmitting, a transmit signal received at the common signal feed 603 is split such that the transmit signal is radiated using each of the antenna elements 602a-602d.

Although shown with four antenna element in a 2×2 array, other numbers of antenna elements (for instance, larger arrays) and/or other arrangements of antenna elements are possible. For instance, tens or hundreds of antenna elements can be included in a passive antenna array.

Figure 7:
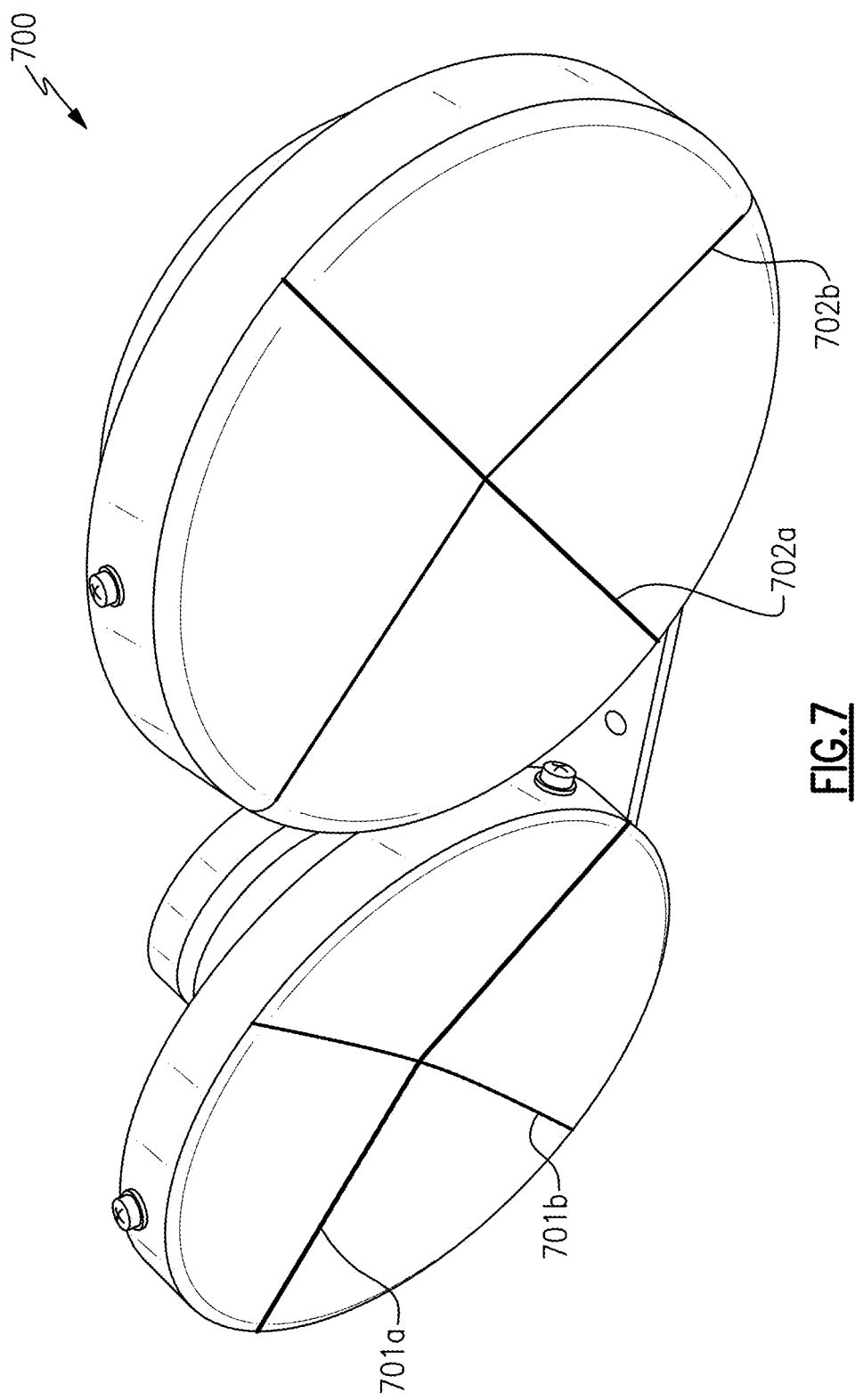
FIG. 7 is a perspective view of a donor antenna unit according to another embodiment.

FIG. 7 is a perspective view of a donor antenna unit 700 according to another embodiment. The donor antenna unit 700 includes four parabolic antennas associated with two types of polarizations. In particular, the donor antenna unit 700 includes a first downlink parabolic antenna 701a with +45° polarization, a second downlink parabolic antenna 701b with −45° polarization, a first uplink parabolic antenna 702a with +45° polarization, and a second uplink parabolic antenna 702b with −45° polarization.

The antenna structures discussed earlier with respect to FIGS. 3D to 3G can be implemented in this manner to provide two types of polarizations for each antenna. Thus, the server antenna unit 140 of FIGS. 3D and 3E can be implemented to provide four horn antennas (a first downlink horn antenna with +45° polarization, a second downlink horn antenna with −45° polarization, a first uplink horn antenna with +45° polarization, and a second uplink horn antenna with −45° polarization). Additionally, the donor antenna unit 150 of FIGS. 3F and 3G can be implemented to provide four parabolic antennas (a first downlink parabolic antenna with +45° polarization, a second parabolic horn antenna with −45° polarization, a first uplink parabolic antenna with +45° polarization, and a second parabolic horn antenna with −45° polarization).

Figure 8:
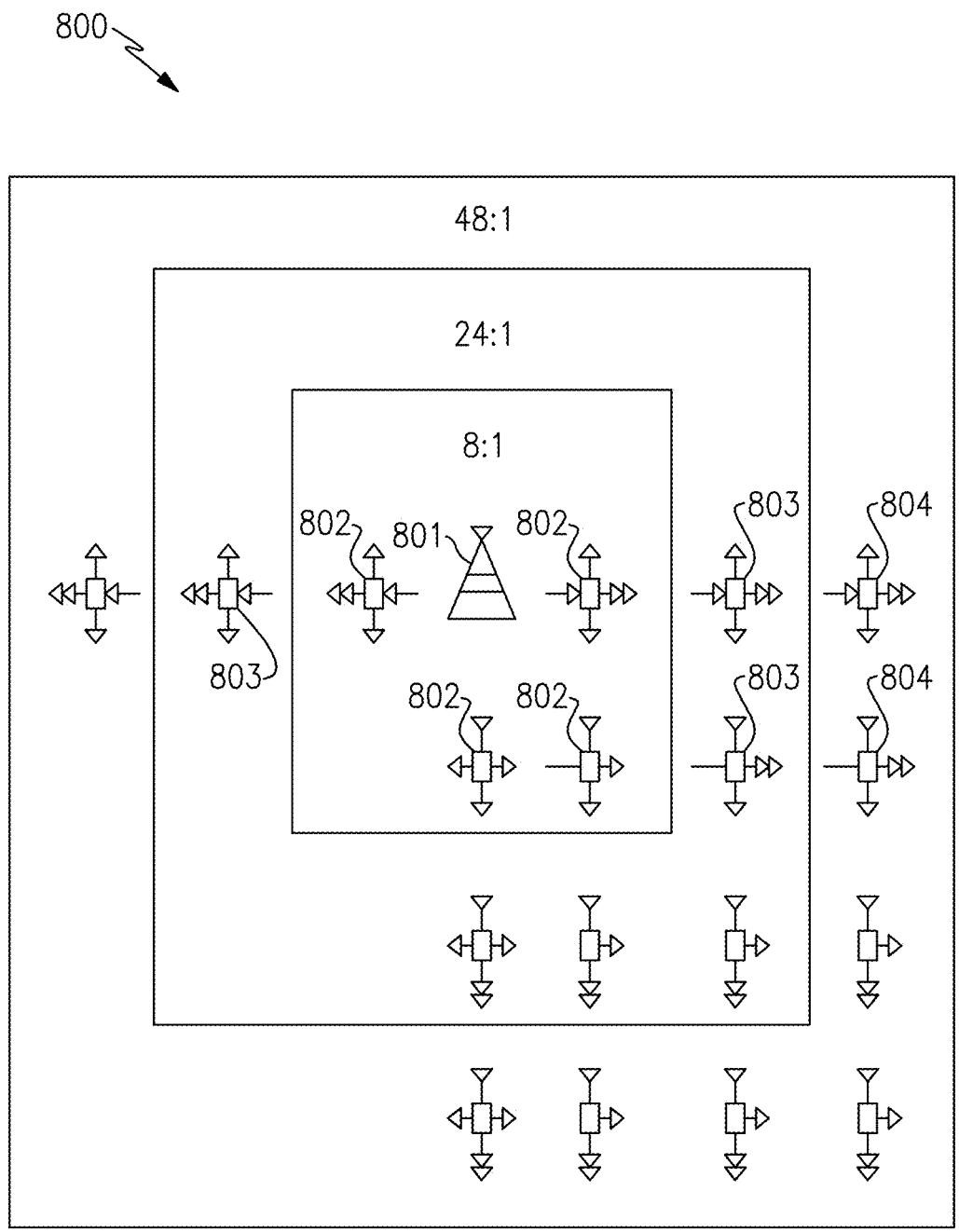
FIG. 8 is a schematic diagram of a portion of a cellular network employing tiers of signal booster systems to extend a range of a base station.

FIG. 8 is a schematic diagram of a portion of a cellular network 800 employing tiers of signal booster systems to extend a range of a base station 801. With respect to certain cellular networks (for instance, 5G networks), the base station 801 can also be referred to as a gNodeB (gNb).

As shown in FIG. 8, tiers of signal booster systems have been used to extend the range of the base station 801. For example, a first tier of signal booster systems 802 (for instance, 8:1 ratio of signal boosters to the base station 801) provides a first amount of range extension of the base station 801, while a second tier of signal booster systems 803 (for instance, 24:1 ratio of signal boosters to the base station 801) and a third tier of signal booster systems 804 (for instance, 48:1 ratio of signal boosters to the base station 801) provides even further extension.

Conventional base stations (for instance, the gNobeB 801) operate with an optical fiber connection to a core network, further driving up cost of ownership and complexity of the cellular network. Not only in such infrastructure costly, but also decreases speed of deployment. For example, a significant investment of time can be needed to obtain city permits, negotiate easements, dig trenches for fiber or cables, and/or to complete installation. Moreover, such base stations can have a limited range (for instance, up to about 250 m for the 28 GHz band).

By including one or more tiers of signal booster systems, the range of a base station can be enhanced. Although an evenly arranged array of signal booster systems is depicted, the signal booster systems can be deployed in a number, orientation, and connectivity desirable for a particular deployment scenario. Accordingly, a wide range of deployment configurations are possible.

FIG. 9A depicts a first screen shot of a mobile device running a signal strength detection application according to one embodiment. FIG. 9B depicts a second screen shot of a mobile device running a signal strength detection application according to one embodiment.

The mobile device running the software application can be for instance, a smart phone or other portable electronic equipment under control of user installing a signal booster system in a cellular network. For example, a technician can include a mobile device having a processor, memory, and display operating in combination with one another to run the application. The mobile device of the user is in communication with a signal boosting unit (for instance, with a communications board of the unit over a wired or wireless connection).

The signal strength detection application serves to help the user to properly align a donor station antenna (or donor station antenna module including multiple donor station antennas) with a base station. As the user moves the donor station antenna relative to the base station, a level of downlink and uplink signal strength (as detected by the signal boosting unit and transmitted to the mobile device) changes due to changes in the SNR of the cellular communication channel.

The application allows the user to select at least one of uplink signal strength or downlink signal strength, and depicts both a best observed signal strength 901 during a session and a current observed signal strength 902. Thus, the user can move or sweep the donor station antenna across a wide angular range to thereby establish a maximum or best observed signal strength 901, and then position the donor station antenna in a position in which the current observed signal strength 902 is about equal to the best observed signal strength 901. The donor station antenna can then be secured (for instance, by way of fasteners through a mounting bracket).

The application depicted in FIGS. 9A and 9B aids a user in quickly and efficiently aligning a donor station antenna of a signal booster system with a suitable base station. The donor station antenna can then be secured in the selected position associated with a good cellular communication link between the base station and the donor station antenna.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not only the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A signal booster system for a high frequency cellular network, the signal booster system comprising:
    a first downlink donor antenna configured to receive a first downlink signal of a frequency band, wherein the frequency band is higher than 20 gigahertz (GHz), and wherein the first downlink donor antenna is a first parabolic antenna;
    a second downlink donor antenna configured to receive a second downlink signal of the frequency band;
    a first uplink server antenna configured to receive a first uplink signal of the frequency band;
    a second uplink server antenna configured to receive a second uplink signal of the frequency band;
    signal booster circuitry including a first downlink amplification circuit configured to amplify the first downlink signal to generate a first amplified downlink signal, a second downlink amplification circuit configured to amplify the second downlink signal to generate a second amplified downlink signal, a first uplink amplification circuit configured to amplify the first uplink signal to generate a first amplified uplink signal, and a second uplink amplification circuit configured to amplify the second uplink signal to generate a second amplified uplink signal;
    a first downlink server antenna configured to transmit the first amplified downlink signal;
    a second downlink server antenna configured to transmit the second amplified downlink signal;
    a first uplink donor antenna configured to transmit the first amplified uplink signal, wherein the first uplink donor antenna is a second parabolic antenna; and
    a second uplink donor antenna configured to transmit the second amplified uplink signal.

2. The signal booster system of claim 1, wherein the frequency band in time-division duplexed (TDD), and the signal booster circuitry does not include any TDD switches.

3. The signal booster system of claim 1, wherein the first downlink donor antenna, the second downlink donor antenna, the first uplink donor antenna, and the second uplink donor antenna are implemented in a common antenna unit.

4. The signal booster system of claim 1, wherein the first parabolic antenna and the second parabolic antenna each have an antenna gain between 27 dBi and 29 dBi.

5. The signal booster system of claim 1, wherein the first downlink server antenna, the second downlink server antenna, the first uplink server antenna, and the second uplink server antenna are sector antennas.

6. The signal booster system of claim 5, wherein the first downlink server antenna, the second downlink server antenna, the first uplink server antenna, and the second uplink server antenna are implemented in a common antenna unit.

7. The signal booster system of claim 6, further comprising an isolation layer separating the first downlink server antenna and the second downlink server antenna from the first uplink server antenna and the second uplink server antenna.

8. The signal booster system of claim 5, wherein the first downlink server antenna, the second downlink server antenna, the first uplink server antenna, and the second uplink server antenna are horn antennas.

9. The signal booster system of claim 5, wherein the first downlink server antenna, the second downlink server antenna, the first uplink server antenna, and the second uplink server antenna have a horizontal beam width of at least about 60 degrees.

10. The signal booster system of claim 1, wherein the frequency band is higher than 30 GHz.

11. The signal booster system of claim 1, wherein the frequency band is a fifth generation (5G) frequency band.

12. The signal booster system of claim 1, wherein none of the first uplink amplification circuit, the second uplink amplification circuit, the first downlink amplification circuit, or the second downlink amplification circuit operates with any frequency conversion.

13. The signal booster system of claim 1, wherein none of the first uplink amplification circuit, the second uplink amplification circuit, the first downlink amplification circuit, or the second downlink amplification circuit operates with any digitization of the first uplink signal, the second uplink signal, the first downlink signal, and the second downlink signal.

14. The signal booster system of claim 1, mounted on a pole.

15. The signal booster system of claim 1, wherein the first downlink donor antenna, the second downlink donor antenna, the first uplink donor antenna, and the second uplink donor antenna operate without any beamforming.

16. The signal booster system of claim 1, wherein the signal booster system does not comprise any antenna arrays.

17. The signal booster system of claim 1, wherein the first downlink donor antenna, the first uplink donor antenna, the first downlink server antenna, and the second uplink server antenna have a first type of polarization, and wherein the second downlink donor antenna, the second uplink donor antenna, the second downlink server antenna, and the first uplink server antenna have a second type of polarization orthogonal to the first type of polarization.

18. The signal booster system of claim 17, wherein the first type of polarization is +45°, and the second type of polarization is −45°.

19. A signal booster system for a high frequency cellular network, the signal booster system comprising:
    a downlink donor antenna configured to receive a downlink signal of a frequency band, wherein the frequency band is higher than 20 gigahertz (GHz), and wherein the downlink donor antenna is a first parabolic antenna;

an uplink server antenna configured to receive an uplink signal of the frequency band;

signal booster circuitry including a downlink amplification circuit configured to amplify the downlink signal to generate an amplified downlink signal, and an uplink amplification circuit configured to amplify the uplink signal to generate an amplified uplink signal;

a downlink server antenna configured to transmit the amplified downlink signal; and an uplink donor antenna configured to transmit the amplified uplink signal, wherein the uplink donor antenna is a second parabolic antenna, and wherein the downlink donor antenna and the downlink server antenna are configured with a first type of polarization, and wherein the uplink donor antenna has the first type of polarization and the uplink server antenna has a second type of polarization orthogonal to the first type of polarization.

20. The signal booster system of claim 1, wherein the second downlink donor antenna is a third parabolic antenna, and wherein the second uplink donor antenna is a fourth parabolic antenna.

\* \* \* \* \*